US006735701B1

(12) United States Patent
Jacobson

(10) Patent No.: US 6,735,701 B1
(45) Date of Patent: May 11, 2004

(54) NETWORK POLICY MANAGEMENT AND EFFECTIVENESS SYSTEM

(75) Inventor: Andrea M. Jacobson, St. Paul, MN (US)

(73) Assignee: MacArthur Investments, LLC, Edina, MN (US)

( * ) Notice: Subject to any disclaimer, the term of this patent is extended or adjusted under 35 U.S.C. 154(b) by 0 days.

(21) Appl. No.: 09/104,946

(22) Filed: Jun. 25, 1998

(51) Int. Cl.[7] ............................................... C06F 11/30
(52) U.S. Cl. ....................... 713/201; 713/202; 713/200
(58) Field of Search ................. 713/200–202

(56) References Cited

U.S. PATENT DOCUMENTS

| | | | | |
|---|---|---|---|---|
| 5,142,612 A | * | 8/1992 | Skeirik | 395/11 |
| 5,197,114 A | * | 3/1993 | Skeirik | 395/22 |
| 5,355,474 A | * | 10/1994 | Thuraisngham et al. | 395/600 |
| 5,408,586 A | * | 4/1995 | Skeirik | 395/23 |
| 5,440,744 A | * | 8/1995 | Jacobson et al. | 395/650 |
| 5,579,222 A | * | 11/1996 | Bains et al. | 395/712 |
| 5,603,054 A | | 2/1997 | Theimer et al. | 395/826 |
| 5,621,889 A | * | 4/1997 | Lermuzeaux et al. | 395/186 |
| 5,797,128 A | * | 8/1998 | Birnbaum | 707/5 |
| 5,845,065 A | * | 12/1998 | Conte et al. | 395/186 |
| 6,070,244 A | * | 5/2000 | Orchier et al. | 713/201 |

FOREIGN PATENT DOCUMENTS

WO    WO 93/11480    6/1993

OTHER PUBLICATIONS

"Data Exchange Executive," IBM TDB, Jul. 1993, vol. 36, Iss No. 7, p. 435–438; {IDB–ACC–No:NN9307435.*
Grimm, R. et al., "Security policies in OSI–management experiences from the DeTeBerkom project BMSec", *Computer Networks and ISDN Systems*, vol. 28, No. 4, pp. 499–511 (Feb. 1996).
"SecureDelete—a utility to delete files securely", http://www.gammon.com.au/utilities/securedelete.htm (Sep. 14, 1998); 3 pgs.
"Review: Burn It", http://macworld.zdnet.com/pages/april.97/Reviews.3342.html (Sep. 14, 1998); 3 pgs.
"Content Advisor—Products Page", http://www.contentadvisor.com/products.products.html (Sep. 14, 1998); 1 pg.
"Content Advisor—Corporate Profile", http://www.contentadvisor.com/company/company.html (Sep. 14, 1998); 1 pg.
"SmartFilter—Tour, Monitoring and Control Features", http://www.sctc.com/P_Tool_SF_Tour_monandcont.html (Sep. 19, 1998); 1 pg.
"SF—Key Advantages", http://www.sctc.com/P_Tool_SF_Keys.html (Sep. 19, 1998); 2 pgs.
"SF—Requirements", http://www.sctc.com/P_Tool_SF_Reqs.html (Sep. 19, 1998); 1 pg.
"Vendor's Guide to Software Pricing . . . ter Articles on License Management", http://www.globetrotter.com/ms_titl.html (Apr. 7, 1998); 6 pgs.
"No Excuses Licensing", http://www.globetrotter.com/ecs1.htm (Feb. 3, 1998); 5 pgs.
"Seven Steps to Overcome Pricing Un . . . ter Articles on License Management", http://www.globetrotter.com/ms_2do.htm (Apr. 7, 1998) 2 pgs.

(List continued on next page.)

*Primary Examiner*—Norman M. Wright
(74) *Attorney, Agent, or Firm*—Moore, Hansen & Sumner

(57) ABSTRACT

A method, apparatus, and article of manufacture for maintaining policy compliance on a computer network is provided. The method provides the steps of electronically monitoring network user compliance with a network security policy stored in a database, electronically evaluating network security policy compliance based on network user compliance, and electronically undertaking a network policy compliance action in response to network security policy compliance.

12 Claims, 51 Drawing Sheets

OTHER PUBLICATIONS

"Conceptual description of a generi . . . ter Articles on License Management", http://globetrotter.com/ms_lm.htm (May 18, 1998) 3 pgs.

"Press Release—Poulton Associates, Inc.", http://www.poulton.com/ispPR4–98.htm (Sep. 23, 1998), 2 pgs.

"ISPCweb—Poulton Associates, Inc.", http://www.poulton.com/ispcweb.htm (Sep. 23, 1998); 2 pgs.

"As courts increasingly hold firms . . . fast becoming a . . . legal necessity", http://www.drj.com/new2dr/w2_022.htm (Feb. 2, 1998); 5 pgs.

"Risk Analysis Techniques", http://www.drj.com/new2dr/w3_030.htm (Feb. 2, 1998); 8 pgs.

"White papers—Watermarking", http://www.dupont.com/Antron/mark.html (Jul. 16, 1998); 1 pg.

"About Digital Watermarks", http://www.digimarc.com/about_wm.html (Mar. 10, 1998); 4 pgs.

"Digimarc Corporate Series", http://www.digimarc.com/corp_solutions.html (Mar. 10, 1998); 3 pgs.

"Welcome to Digimarc", http://www.digimarc.com/ (Mar. 10, 1998); 2 pgs.

"MarcCentre", http://www.digimarc.com/marc_page.html (Mar. 10, 1998); 1 pg.

"Data Devices International—Tape Backup Procedures and Maintenance", http://www.datadev.com/tapebackup/tapebackup.htm (Sep. 9, 1998); 2pgs.

"Halebopp Backup Procedures", http://www.gb.nrao.edu/~cmyers/backup.html (Sep. 9, 1998); 2 pgs.

"ISSEL—Intra.doc! Management System", http://www.issel.co.uk/intradoc_ms.html (Feb. 23, 1998); 2 pgs.

"ISSEL—Intra.doc! Architecture", http://www.issel.co.uk/intradoc_architecture.html (Feb. 23, 1998); 2 pgs.

"Intra.doc! Product Suite", http://www.intranetsol.com/products/prodsuit.html (Feb. 23, 1998); 8 pgs.

"Intra.doc! Management System—Web . . . nagement and Enterprise Publishing", http://intranetsol.com/products/ms-broch.html (Feb. 23, 1998); 4 pgs.

"High–tech Manufacturer Gains Compe . . . With Web–based Document Management", http://www.intranetsol.com/products/success/sshight.html (Feb. 23, 1998) 3 pgs.

"QRMS—Features", http://www.qrms.com/features.htm (Feb. 18, 1998); 19 pgs.

"The TPI Group Inc.—Software Asset Management", http://www.tpi–group.com/whitepapers/wpsasset.html (Feb. 3, 1998); 1 pg.

"The TPI Group—Software Asset Management in a Client Server Architecture", http://www.tpi–group.com/whitepapers/wpsasset.html (Feb. 3, 1998); 11 pgs.

Branscum, D., "bigbrother@the.office.com—Your boss can track every click you make.", *Newsweek*, Apr. 27, 1998, p. 78.

Fox, J., "Compensating your executive team on a shoestring", *Ventures*, Nov. 1997, pp. 14–16.

"Corel WordPerfect Suite 8—Data Formats Supported", White Paper, Aug. 1997 (p. 16).

* cited by examiner

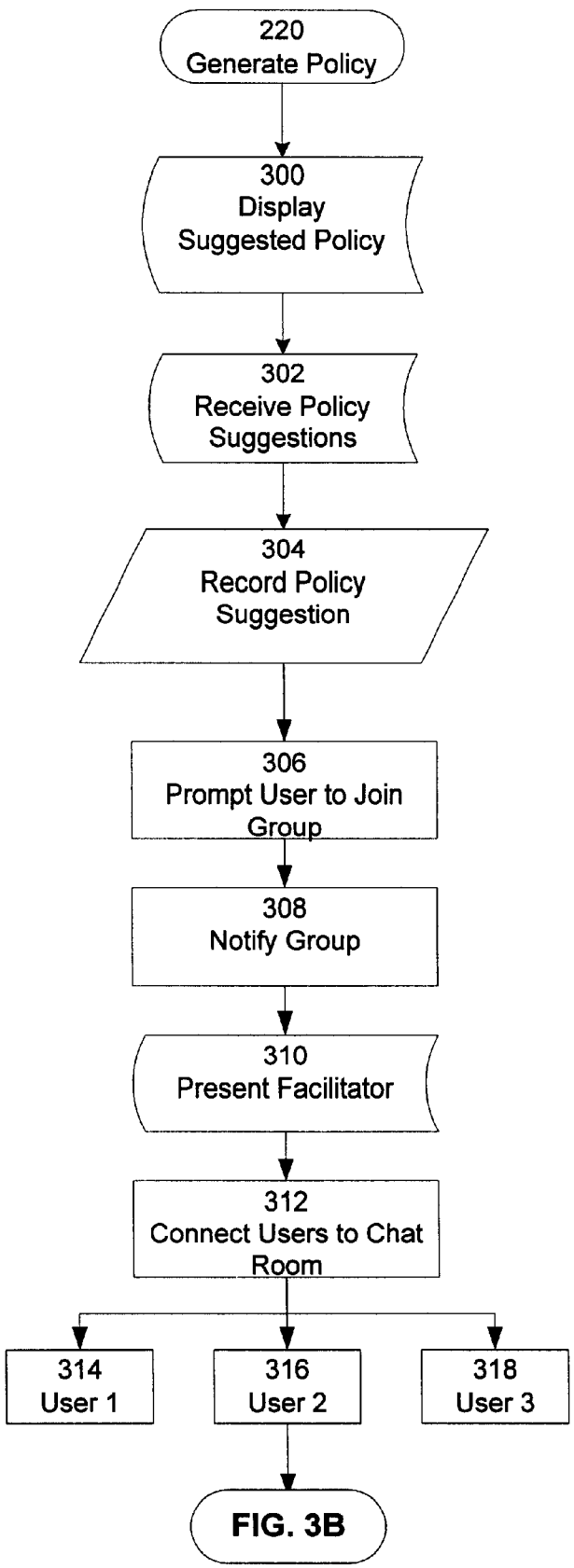

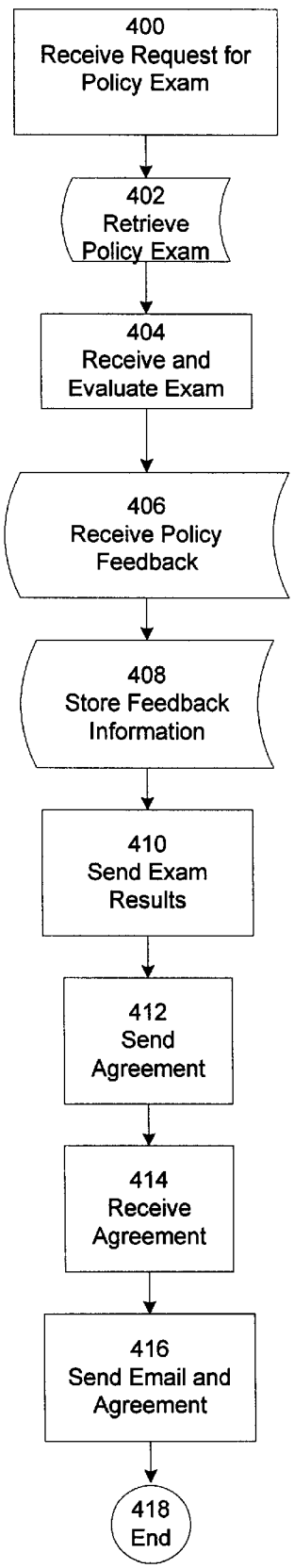

Figure 13

Privacy Statement for Virtual Policy Builder

Virtual WorkSpace has created this privacy statement in order to demonstrate our firm commitment to privacy. The following discloses our information gathering and dissemination practices for this site; Virtual Policy Builder.

Your IP address is used to help identify you and your shopping cart.

Our site's registration form requires users to give us contact information (like their email address) and demographic information (like their zip code, age, or income level). The customer's contact information is used to contact the visitor when necessary. Users may opt-out of receiving future mailings; see the delete/deactivate section below. Demographic and profile data is also collected at our site. We use this data to tailor the visitor's experience at our site, showing them content that we think they might be interested in, and displaying the content according to their preferences.financial information (like their account or credit card numbers)&]. Financial information that is collected is used to bill the user for products and services.

Opt-Out

Our site provides users the opportunity to opt-out of receiving communications from us at the point where we request information about the visitor.

Delete/Deactivate

This site gives users the following options for removing their information from our database to not receive future communications or to no longer receive our service.
You can send email to delete@ virtualworkspace.com Change/Modify This site gives users the following options for changing and modifying information previously provided. Email update@ virtualworkspace.com ( < ) ( > ) ( MAIN MENU ) ( EXIT )

Figure 21

Writing the Policy

Suggested Policy: To comply with laws governing software protection from piracy employees must not:
- Make copies of any software unless explicitly authorized.
- Exchange, trade or transfer copies of any software to others in cyberspace.
- Download copies of software that normally would have to be purchased.
- Purchase any software from the Internet without prior approval If you encounter pirated software or suspect software may have been pirated, notify the system administrator immediately and distance yourself from the real or suspected illegal activity.

Facilitator: If I am correct, you want this section added to the policy?
Add>>> *All software downloads can be approved by the system administrator. The user needs to email the system administrator to get approval for downloading the software.*

Figure 26

Training Feedback Form

Was the subject pertinent to your needs and interests?
  No                                To some extent
  Very Much So Excellent   Satisfactory   Dissatisfacory
Adequacy of Course Content
Length of Course
Adequacy of Course Materials
Adequacy of Learning Experience
Adequacy of Facilities If any factor is rated "unsatisfactory", please provide explanation:

What was of least value to you in this seminar?

What was of most value to you in this seminar?

How will you apply this learning back on the job?

Would you recommend this course for other individuals/teams?
  Yes                 No ( < ) ( > )  ( MAIN MENU )  ( EXIT )

Figure 28

Acceptable Use Agreement

CONTINUE

8. The company operates a reliable and effective computing environment and network, however the company does not warrant that the system will meet any specific user requirement or that the system will be error free or uninterrupted. The company shall not be liable for any direct or indirect, incidental or consequential damages sustained or incurred on connection with the use or inability to use the company system.

User Signature

_____

Date: _____

Manager:

_____

Internet e-mail address:

_____@_____

Click Icons to accept or decline the terms of the Acceptable Use Policy.

( Accept )            ( Decline )

(<) (>) ( MAIN MENU )  ( EXIT )

The End.....

Thank your for participating in the
policy training program.

Figure 31

User Profile

Name:
Employee Number:
Email Address:
Surface Mail Address:
Employment status (i.e. temp, contract, virtual):
Organizational/reporting chart :
Title:
Department/Unit Title:
Branch/Division:
Mail Address:

USER PROFILE REPORTS

User's Employment Agreements and other contracts:
Policy Training and Exam status:
Policy Compliance History
Network Activity History
Special Network Access or Privileges
Email storage allocation
Document access level
User Access to including failed login attempts
All attempts to launch privileged applications
Any changes to system configuration parameters
Software downloads from the Internet
Software usage
Hardware usage
Software present on a user's workstation
User's system access and security status
Identify need for upgrades
Identify need for training

MAIN MENU | SEND | PRINT | EXIT

Figure 38

Policy Compliance Report Form

Violator's Name:

Email address:

Title:

Department:

Mail Station

Violation: ▮ Minor Violation    ▮ Major Violation
Type of Violation: (choose from drop down box)

[                                    ]

Branch Location:

Date of Occurrence:

Date of report

Official reporting the incident

Policy Administrator:

Additional details:

[ Ok ]   [ Reset ]   [ Cancel ]

( > ) ( < ) ( MAIN MENU ) ( SEND ) ( PRINT ) ( EXIT )

Figure 40

Policy Knowledge Query

Name: _____

Violation: ▨ Minor Violation  ▨ Major Violation
Type of Violation: (choose from drop down box)

[                                              ]

Branch Location: _____
Date: _____
Policy Administrator: _____

Additional details:

[                                              ]

[ Search ]   [ Reset ]   [ Cancel ]

USER HELP   Click icon for more information on how to respond to a violation report.

(<) (>) ( MAIN MENU ) ( SEND ) ( PRINT ) ( EXIT )

Figure 41

Policy Compliance Report Form

Violator's Name:

Email address:

Title:

Department:

Mail Station

Violation: ▮ Minor Violation    ▮ Major Violation
Type of Violation: (choose from drop down box)

Branch Location:

Date of Occurrence:

Date of report

Official reporting the incident

Policy Administrator:

Additional details:

[ Ok ]  [ Reset ]  [ Cancel ]

( > ) ( < ) ( MAIN MENU )  ( SEND )  ( PRINT )  ( EXIT )

Figure 43

System Violation Notice
Email and Snail Maill Notice

| | |
|---|---|
| Name: | Jane Doe |
| User Profile: | (Review Profile from drop down menu) |
| Violation Type: | Sent an email with confidential file attachment |
| Violation level: | Level 2 |
| Branch Location: | Minneapolis |
| Time: | 11:20 a.m. |
| Date: | May 20, 1998 |
| CC: | Jsmith@Virt.com |
| | PolAdm@Virt.com |
| | Policy@virtualworkspace.com |
| File Attachments: | Scheduling and violation report |

The system indicates you have violated a virtual policy. Attached is a policy violation claim report for your review.

We will need your assistance to investigate the claim to determine if it is indeed accurate and if it warrants further discussion. Please follow the procedures below:

- Review the attached policy violation claim report
- Review your User's Violation History file at http://www.uservi.com.
- Indicate any discrepancies in any of the reports
- Indicate your availability for an in-person follow up meeting For further information click the user icon (User)

All report and investigation information is automatically recorded in the system.

Thank you for your cooperation.

[>] [<] ( MAIN MENU ) ( SEND ) ( PRINT ) ( EXIT )

Figure 44

Subsequent Action Report

Name:                Jane Doe

Violation level:     Level 2
Branch Location:     Minneapolis
Time:                11:20 a.m.
Date:                May 20, 1998
CC:                  Jsmith@Virt.com
                     PolAdm@Virt.com
                     Policy@virtualworkspace.com
File Attachments:       Subsequent Action Report Following the violation meeting, Human Resources and the user are required to file a subsequent meeting report to verify their attendance at the meeting.

The report can be accessed by click the report icon (Report)

If you have any additional questions or concerns, you may contact the Policy Administrator via email: PolAdm@Virt.com or by calling 555-1212.

If you do not agree with the outcome of the meeting, you may file for an appeal. To begin the appeal process, click on the appeal icon (Appeal)

( > ) ( < ) ( MAIN MENU ) ( SEND ) ( PRINT ) ( EXIT )

NETWORK POLICY MANAGEMENT AND EFFECTIVENESS SYSTEM

BACKGROUND

1. Field of the Invention

This invention relates in general to networked computing systems, and more particularly, to a system for maintaining network security policy compliance.

2. Description of Related Art

The Internet and computer networks allow organizations to store applications and information on central servers, waiting to be called up and manipulated from any location. Networks allow people greater access to files and other confidential information. Global networks, including the Internet, and remote access increase the vulnerability of corporate data, increase the risk of information leaks, unauthorized document access and disclosure of confidential information, fraud, and privacy.

Employees are the greatest threat to an organization's information security. Employees with access to information resources including email, the Internet, and on-line networks significantly increase the security risks.

Employees are using email for personal purposes creating questions of appropriate use of company resources, workplace productivity and appropriateness of message content. One of the greatest sources of information leaks is employee sent email. With electronic communication and networks, an electronic paper trail is harder to determine, since no record of who accessed, altered, tampered with, reviewed, or copied a file can make it very difficult to determine a document's authenticity, and provide an audit and paper trail. In addition, there is no automated system to centrally collect, analyze, measure, index, organize, track, determine authorized and unauthorized file access and disclosure, link hard copy information with electronic files including email, and report on how information flows in and out of an organization.

Setting proper use and security policies are a method to create order and set standards for network use. Policies are ineffective unless users understand and comply with the policies. Unfortunately, most organizations do not have tangible proof when, and if, a network-based policy violation has occurred until long after the damage has been done. Due to the technical nature of network policy violations, policy enforcement officers may not have adequate knowledge, skill, and evidence to properly execute a policy violation claim. Cases of selective policy enforcement can occur if policy violations are not consistently reported, filed, investigated, and resolved.

Employees often view e-mail as equivalent to a private conversation. This view often does not reflect the official position of the organization. These communications reflect preliminary thoughts or ideas that have not been reviewed by the organization and typically only reflect the personal opinion of the parties involved. Yet, since employees of the organization create these communications, courts and regulatory agencies have concluded that employee communications can reflect the organization's view. There is a further need for network communications software programs that offers robust policy compliance assistance, policy effectiveness monitoring and reporting.

There is a need for an automated system to assist policy enforcement officers with proper policy enforcement procedure, and methods to measure policy effectiveness, appropriateness, user system activity and compliance.

SUMMARY OF THE INVENTION

To overcome the limitations in the prior art described above, and to overcome other limitations that will become apparent upon reading and understanding the present specification, the present invention discloses a method and apparatus for maintaining policy compliance on a computer network. A system in accordance with the principles of the invention performs the steps of electronically monitoring network user compliance with a network security policy stored in a database, electronically evaluating network security policy compliance based on network user compliance, and electronically undertaking a network policy compliance action in response to network security policy compliance. The network policy compliance actions may include electronically implementing a different network security policy selected from network security policies stored in the database, generating policy effectiveness reports, and providing a retraining module to network users.

One preferred embodiment of the present invention includes notifying a network user and a policy administrator, providing a retraining module to the network user, and restricting the network user's network access rights in response to monitoring network user compliance.

These and various other advantages and features of novelty which characterize the invention and various preferred embodiments are pointed out with particularity in the claims which are annexed hereto and which form a part hereof. However, for a better understanding of the invention, its advantages, and the objects obtained by its use, reference should be made to the drawings which form a further part hereof, and to accompanying descriptive matter, in which there is illustrated and described specific examples of apparatus in accordance with preferred embodiments of the invention.

BRIEF DESCRIPTION OF THE DRAWINGS

Referring now to the drawings in which like reference numbers represent corresponding parts throughout:

FIGS. 3A–3C are block diagrams further illustrating the steps performed by a policy training module according to an embodiment of this invention;

FIG. 4 is a block diagram further illustrating the steps performed by a policy training module in administering a policy training exam;

FIGS. 13 and 14 are exemplary screen displays illustrating the terms of the privacy agreement according to an embodiment of the invention;

FIG. 21 is an exemplary screen display illustrating policy writing according to an embodiment of the invention;

FIG. 26 is an exemplary screen display illustrating a training feedback and evaluation form according to an embodiment of the invention;

FIG. 28 is an exemplary screen display illustrating an Appropriate Use Agreement/Employee Agreement form according to an embodiment of the invention;

FIG. 31 is an exemplary screen display illustrating the User Profile according to an embodiment of the invention;

FIG. 38 is an exemplary screen display illustrating a policy compliance violation report according to an embodiment of the invention;

FIG. 40 is an exemplary screen display illustrating a policy knowledge query according to a embodiment of the invention;

FIG. 41 is an exemplary screen display illustrating a policy compliance violation report according to an embodiment of the invention;

FIG. 43 is an exemplary screen display illustrating a System Violation Notice Email and Snail Mail Notice according to an embodiment of the invention;

FIG. 44 is an exemplary screen display illustrating a Subsequent Action Report according to an embodiment of the invention;

DETAILED DESCRIPTION OF THE INVENTION

In the following description of the exemplary embodiments, reference is made to the accompanying drawings that form a part hereof, and in which is shown by way of illustration a specific embodiment in which the invention may be practiced. It is to be understood that other embodiments may be utilized and that structural changes may be made without departing from the scope of the present invention.

The present invention provides a method and apparatus for maintaining policy compliance on a computer network.

Figure 1:
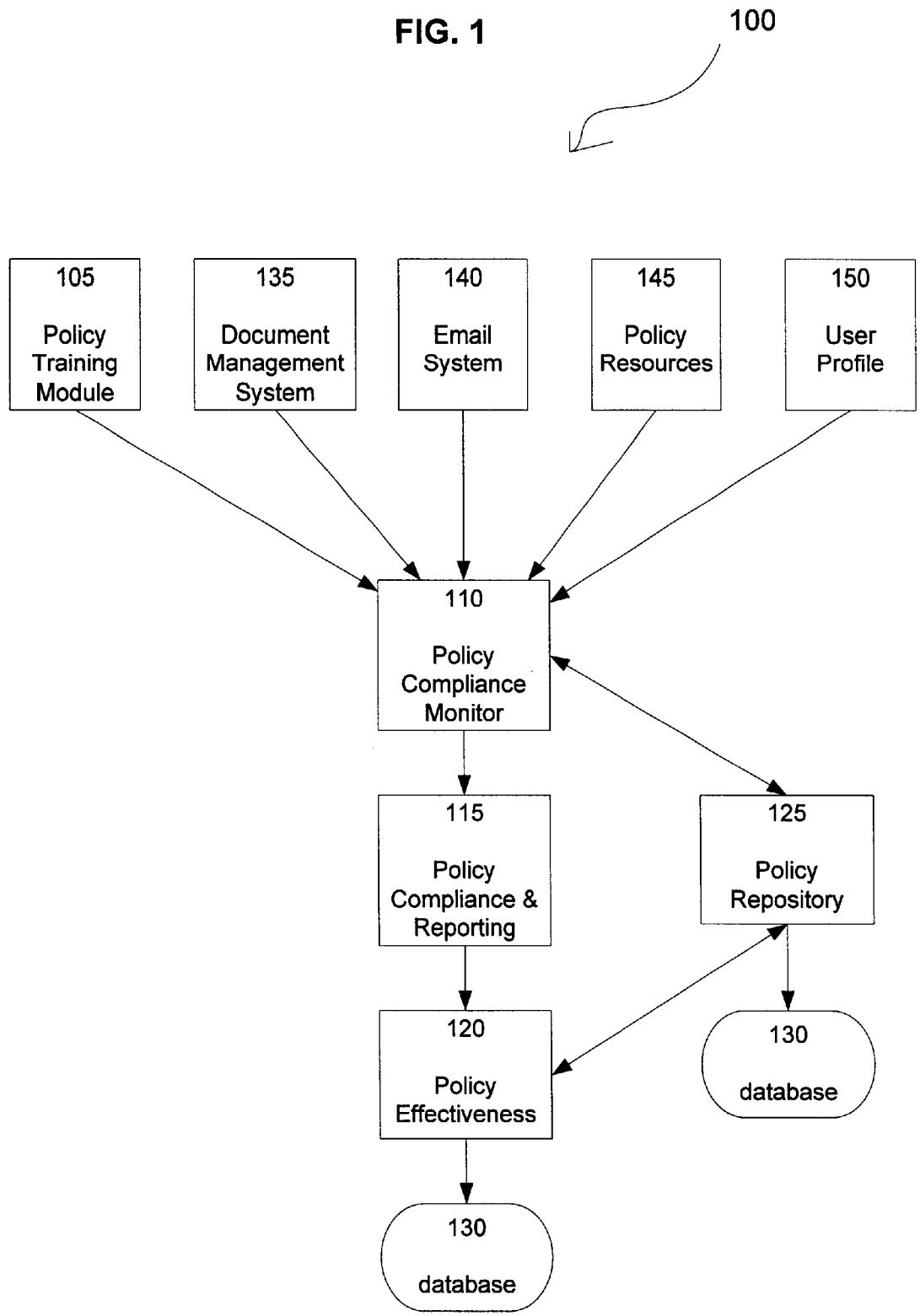
FIG. 1 is a block diagram illustrating a policy effectiveness system according to an embodiment of this invention.

FIG. 1 is a block diagram illustrating policy effectiveness system 100 according to an embodiment of this invention. The hardware generally implementing the policy effectiveness system 100 may include computers having processors and memories distributed over a network as is well-known in the art. The memory may include RAM or fixed storage. The program steps implementing this invention are stored in the memory and executed by the computer processor. The present invention is may be implemented using an intranet based application that can be stored on central servers, waiting to be called up and manipulated via a Web browser from any location. Those skilled in the art will recognize that a variety of configurations can be used without departing from the scope of the present invention and that a wide variety of distributed and multi-processing systems may be used. Each of the blocks of FIG. 1 will be introduced, followed by a detailed explanation of each block.

Block 105 represents a policy training module for developing network security policies.

Block 110 represents a policy compliance monitor for monitoring compliance across the network.

Block 115 represents a policy compliance and reporting module for managing information received from the compliance monitor.

Block 120 represents the policy effectiveness module for managing the policy training module 105 and compliance monitor 110.

Block 130 represents the database for storing policy and compliance information for the policy effectiveness system 100.

Block 135 represents the document management system of the compliance monitor 130.

Block 140 represents the email compliance system of the compliance monitor 130.

Block 145 represents the policy resource module for storing and managing policy resources.

Block 150 represents the user profile module for storing user information.

Policy Training Module 105

The policy training module 105 typically is an interactive, multimedia, policy awareness training program which helps employees gain a better understanding of the basic concepts of network security, email and Internet technologies.

The policy training module 105 presents the network user with a suggested network policy the organization wishes to implement. Policy training module 105 is designed to help the user understand potential risks that an organization faces if a policy is not implemented, the potential advantages and disadvantages of the policy in question, and the management and ethical principles affecting the potential policy in question. The network policies are generated by guidelines created from employee feedback obtained during a training session.

The policy training module 105 is comprised of several templates. When the system is first implemented, policy consultants work with management personnel within an organization to determine the organization's policies for the initial training sessions, which may relate to, for example, an entire enterprise or a specific department of an enterprise. The initial policies are entered into a policy training database 130 and are the foundation for the initial training programs. As is further described below, after the initial policy training session, the policy effectiveness system 100 will analyze all of the information gathered from the areas it monitors and compare it to each network user profile 150 to determine the policy training needs of individual network users. Then, the system customizes the policy training materials for the user training sessions.

To access policy training materials, the user is prompted to enter a password and hardware token. The user may be shown a hypertext list of policy training options. The training options may be, for example, to enter a policy training session, review for a policy exam, or take a policy exam.

Policy Training Session

The policy training session may combine interactive multimedia, group policy development discussions, and policy exercises with individual policy review and feedback screens. The result is typically employee generated policy guidelines for network security policies.

In the preferred embodiment, the computer screen for the policy training session is divided into three frames. The divided screen gives the user the option to review and answer policy recommendation questions, see and participate in group policy discussions, and pause the interactive group policy discussion session. After pausing the interactive group policy discussion section, the user may review dynamic policy recommendations and statistics from previous policy sessions, request additional information on a topic or subject presented during the previous policy session, or seek technical and product support.

The policy training module 105 collects and records both individual and group policy recommendations. The policy training module 105 uses the user's policy recommendations as a benchmark for other users to use during policy creation/training sessions, and to track policy training effectiveness.

Figure 2:
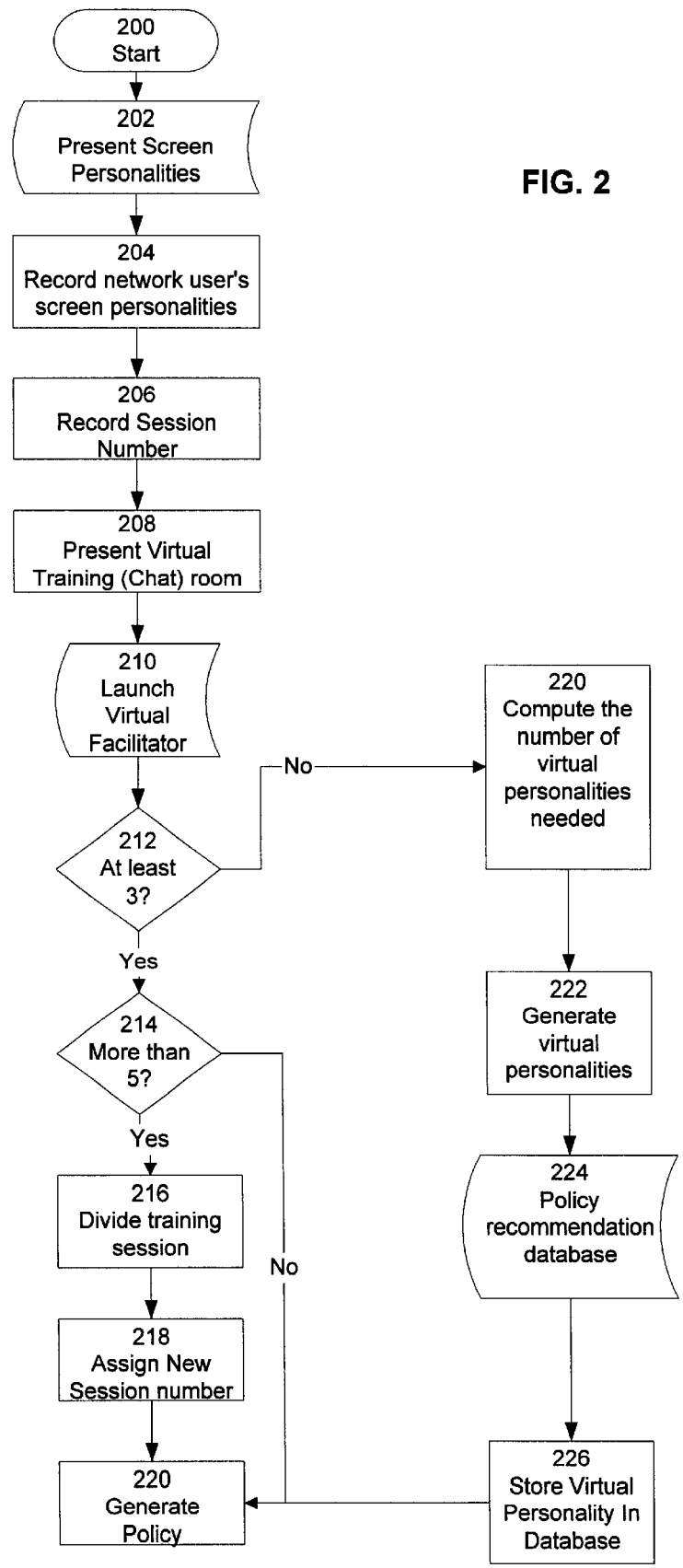
FIG. 2 is a block diagram illustrating the steps performed by the policy training module according to an embodiment of this invention.

FIG. 2 is a block diagram illustrating the steps performed by the policy training module according to an embodiment of this invention.

Figure 10:
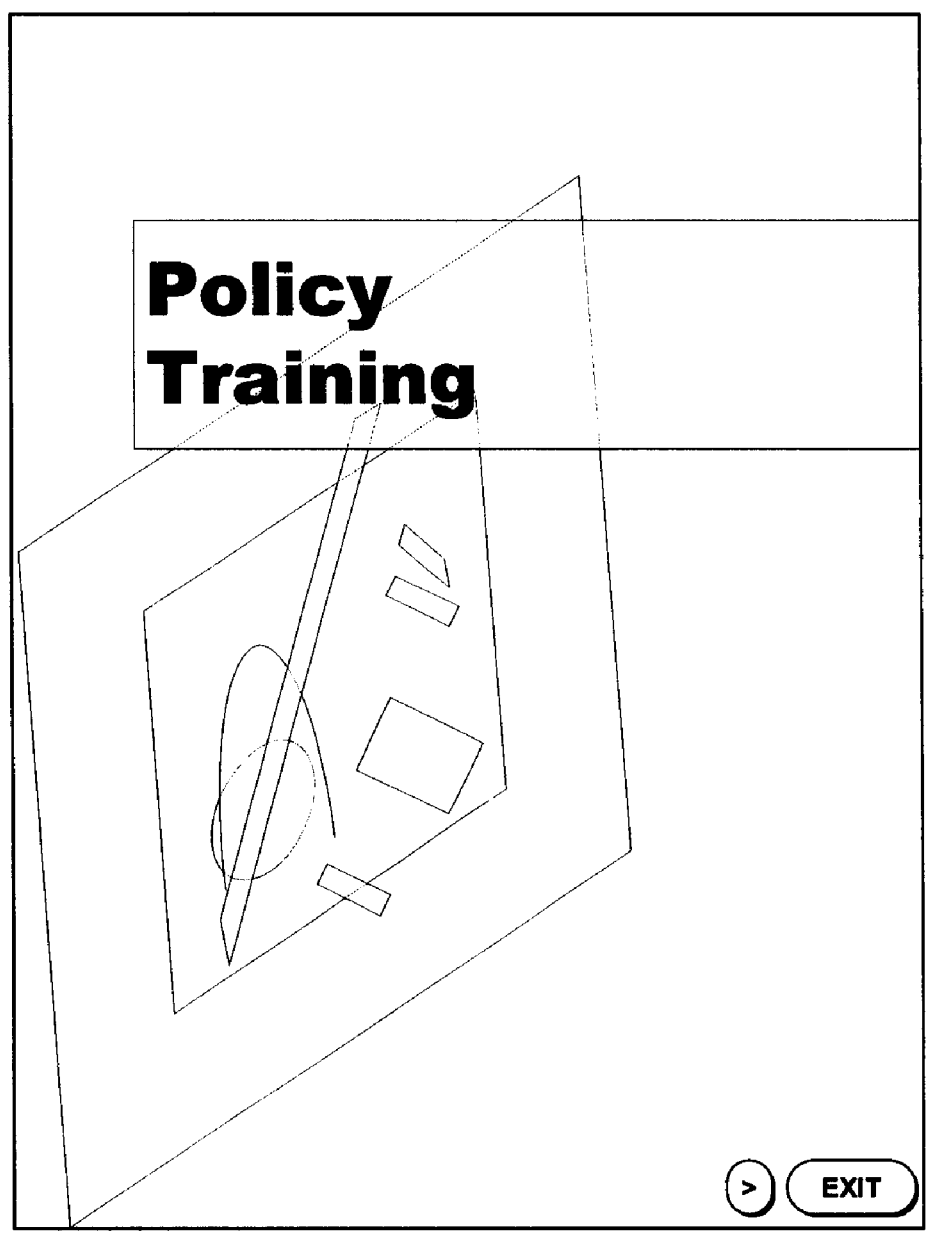
FIG. 10 is an exemplary screen display illustrating the opening screen for policy training according to an embodiment of the invention.
Figure 11:
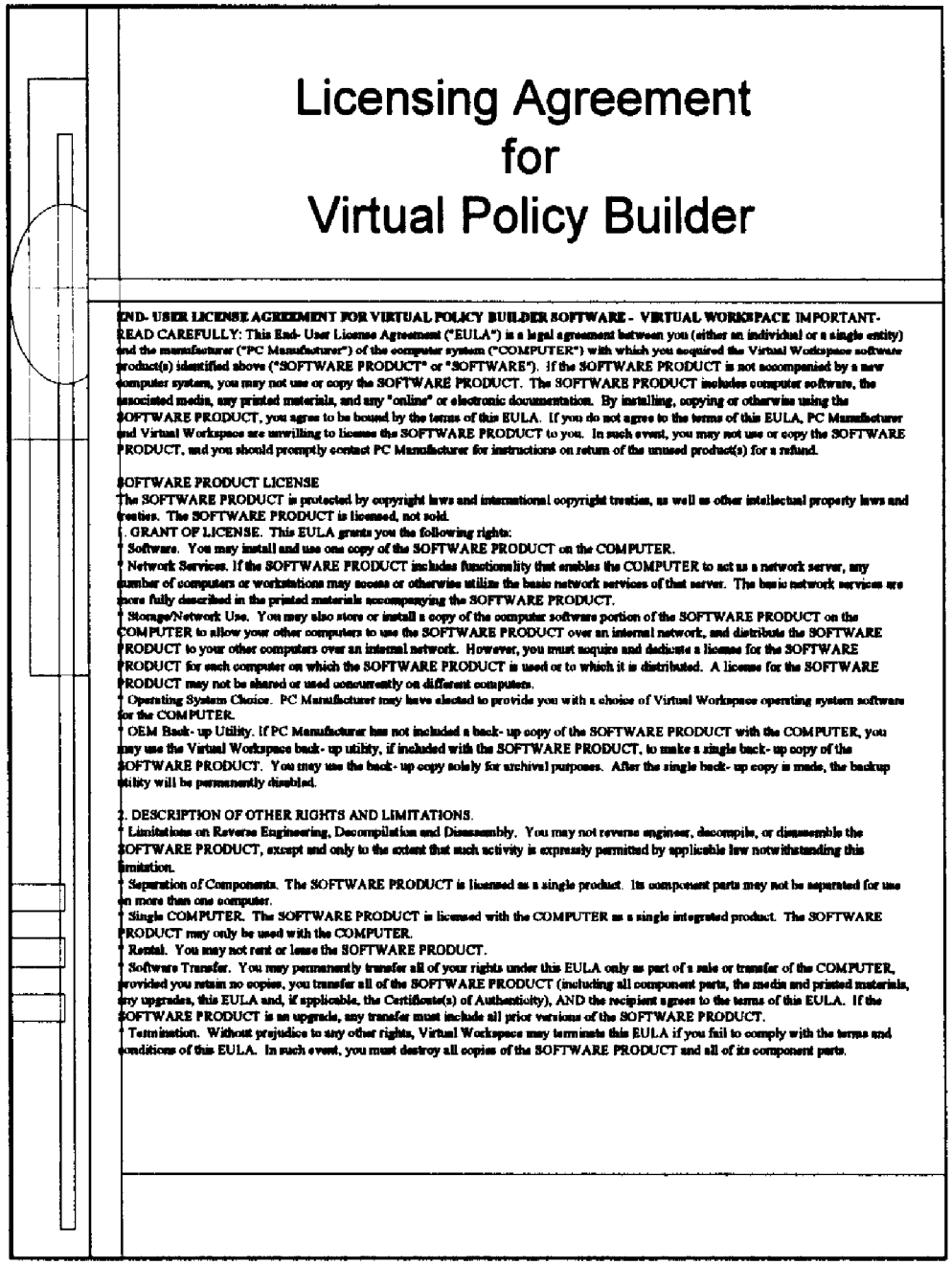
FIG. 11 is an exemplary screen display illustrating the terms of the software licensing agreement according to an embodiment of the invention.
Figure 12:
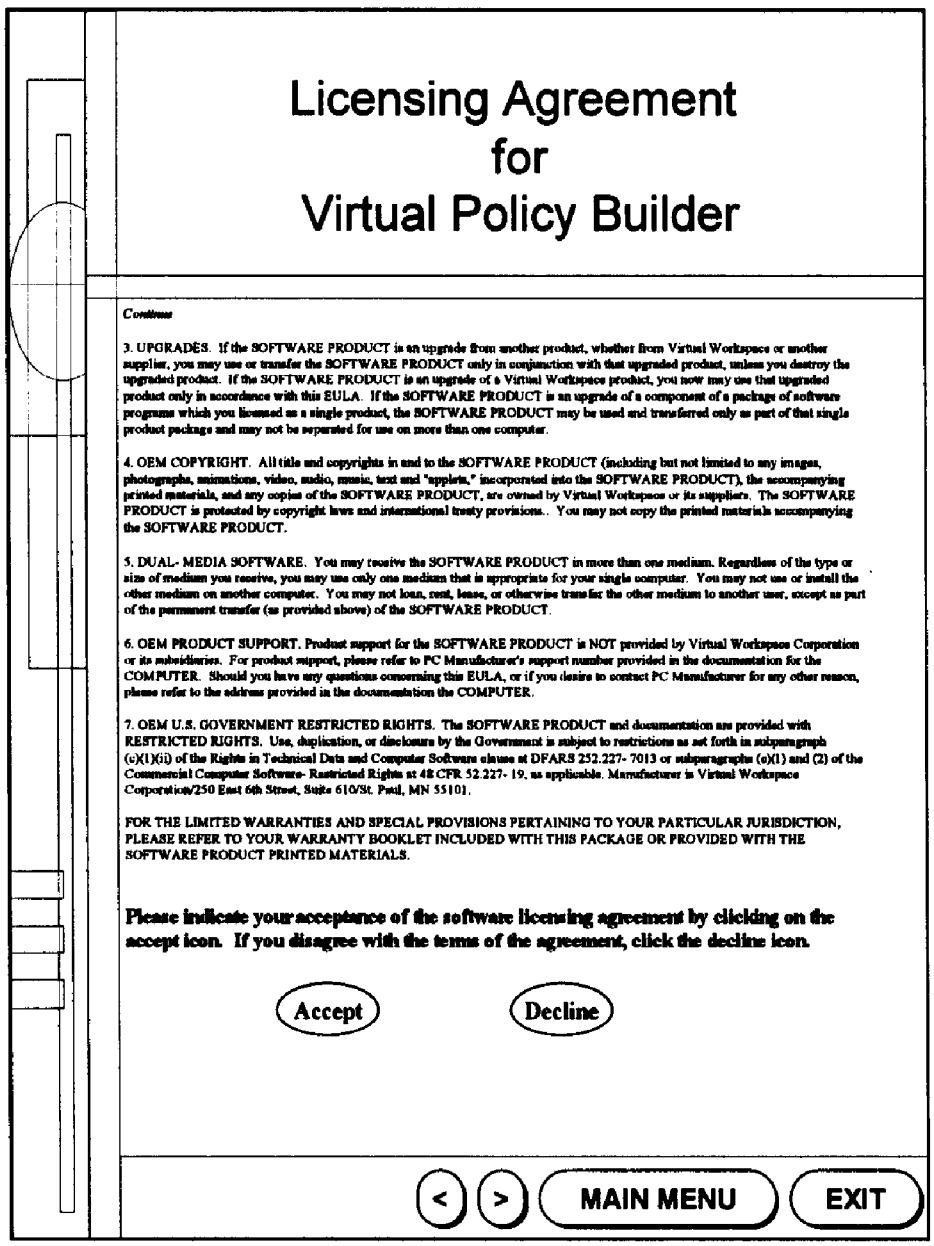
FIG. 12 is an exemplary screen display illustrating the terms of the continuation of the software licensing agreement according to an embodiment of the invention.
Figure 14:
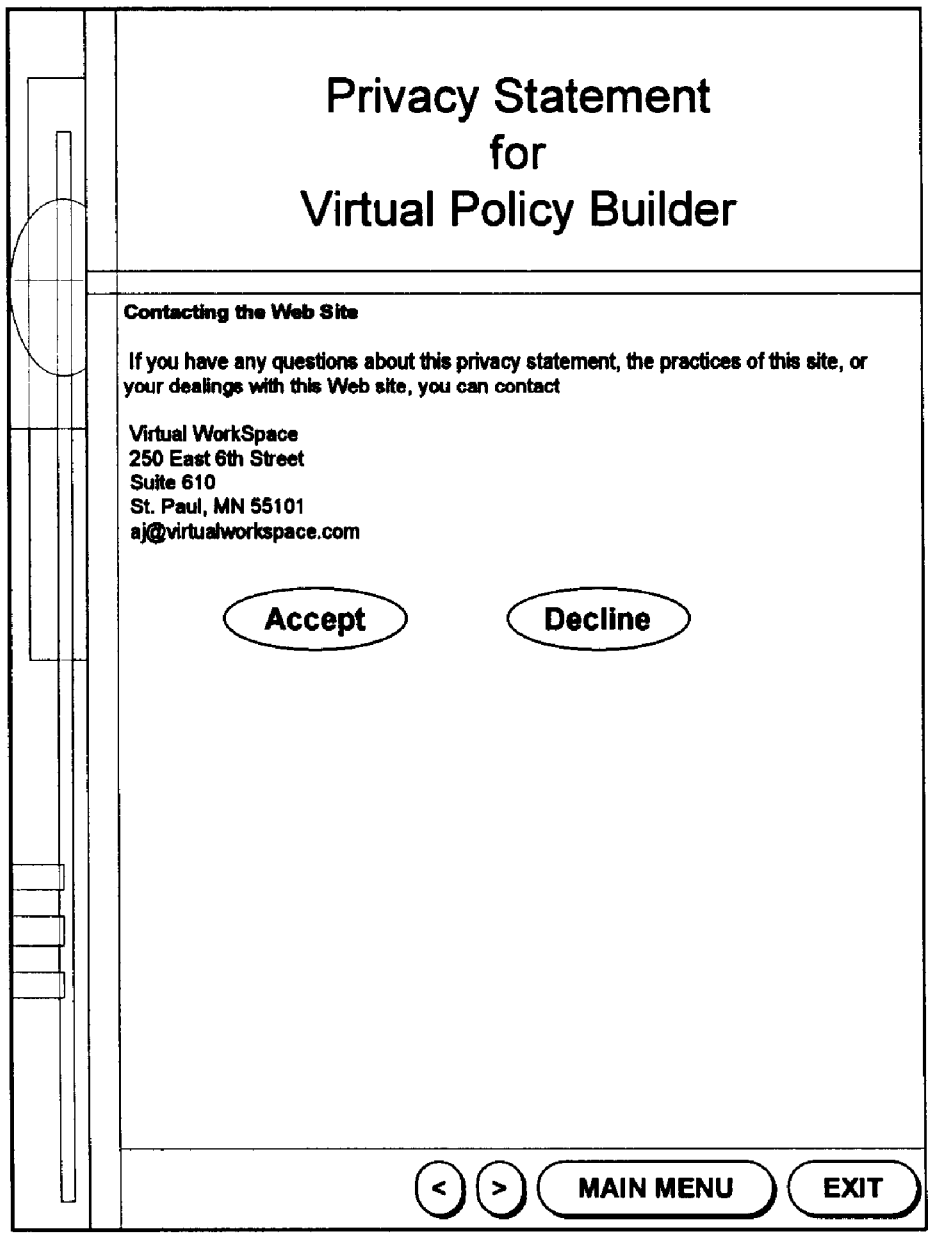

Block 200 represents the beginning of the policy training process. FIG. 10 is an exemplary screen display illustrating the opening screen for policy training according to an embodiment of the invention. The user may be asked to read a licensing agreement and indicate if he accepts or declines the terms of the agreement by clicking on the appropriate icon. FIG. 11 is an exemplary screen display illustrating the terms of the software licensing agreement according to an embodiment of the invention. FIG. 12 is an exemplary screen display illustrating the terms of the continuation of the software licensing agreement according to an embodiment of the invention. A message stating the privacy rights of the user typically remains on the screen until the user clicks on an accept or decline icon. FIGS. 13 and 14 are exemplary screen displays illustrating the terms of the privacy agreement according to an embodiment of the invention.

Figure 15:
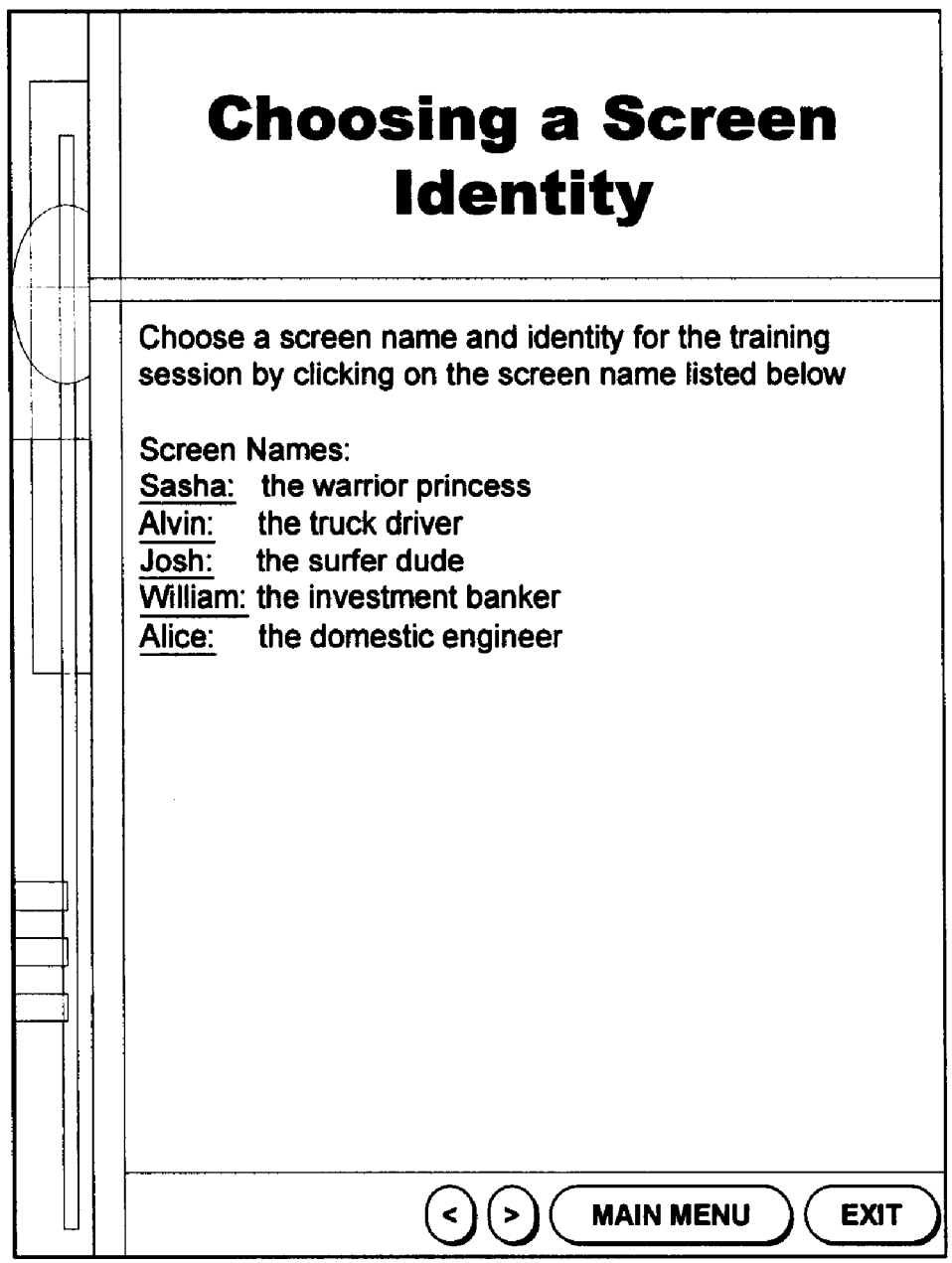
FIG. 15 is an exemplary screen display illustrating the choosing a screen identity according to an embodiment of the invention.

Block 202 represents the policy training module 105 presenting the network user with screen personality options. A screen personality represents a person who is executing the training session under an assumed screen name and identity. In other words, a screen relates to a real person taking a training session. The user is typically presented with a screen and is asked to choose a screen name and identity (e.g., Avatar) from a list of screen personalities for the training session. Such screen personalities give users greater privacy and the freedom to answer policy questions without fear of retaliation from other employees participating in the program. FIG. 15 is an exemplary screen display illustrating the choosing a screen identity according to an embodiment of the invention.

Block 204 represents the policy training module 105 recording the network user's screen personality in the policy effectiveness database.

Figure 16:
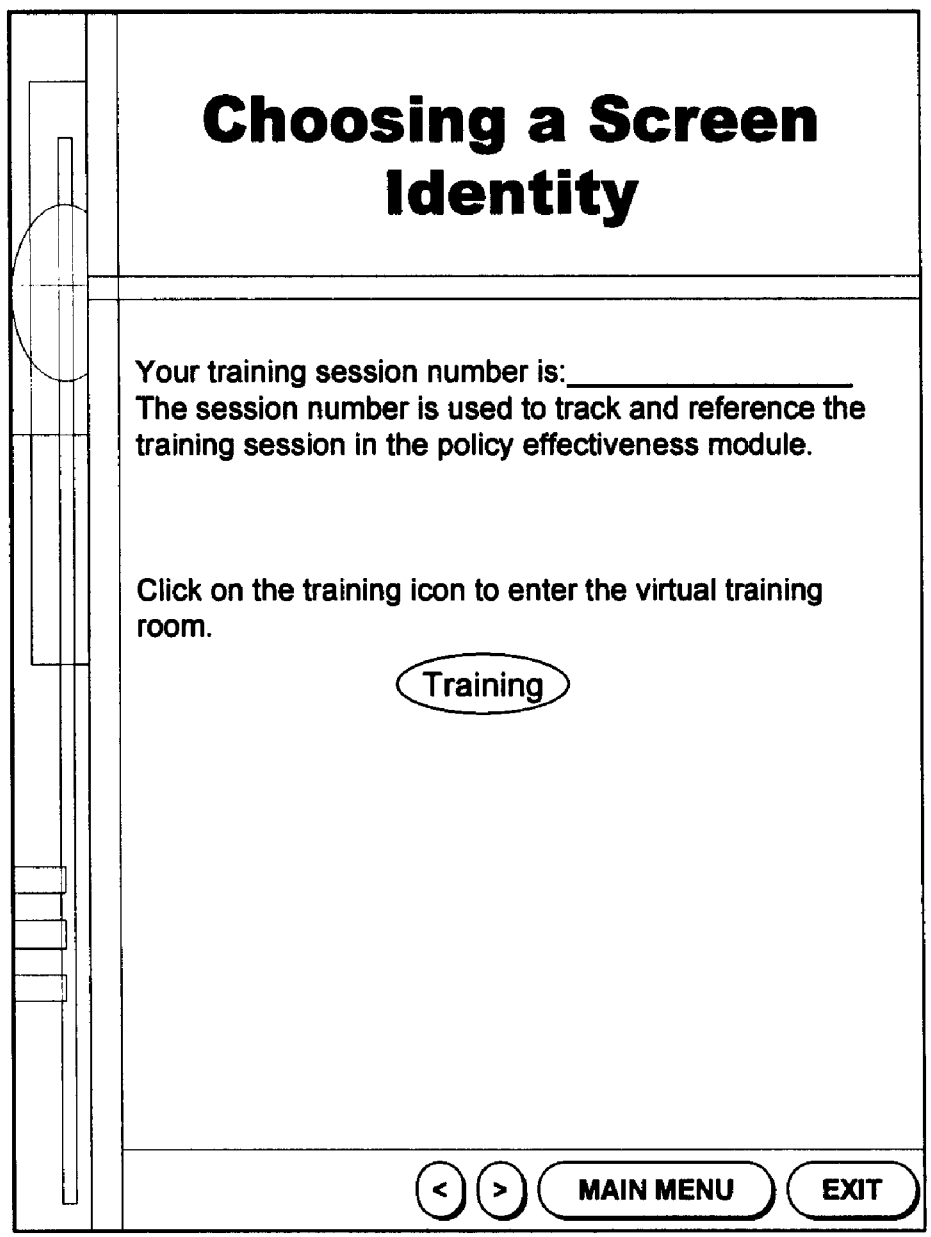
FIG. 16 is an exemplary screen display illustrating assigning the user a session number according to an embodiment of the invention.

Block 204 represents the policy training module 105 assigning the user a session number. FIG. 16 is an exemplary screen display illustrating assigning the user a session number according to an embodiment of the invention.

Block 206 represents the policy training module 105 recording the network user's session number. The session number may be used to track and reference the training session in the policy effectiveness module.

Block 208 represents the policy training module 105 presenting the network user with a virtual training room. The user may be prompted to click on an icon to enter the virtual training room. The virtual training room is typically similar to an Internet chat room.

Figure 17:
FIG. 17 is an exemplary screen display illustrating the introduction to the virtual facilitator according to an embodiment of the invention.

Block 208 represents the policy training module 105 presenting a virtual facilitator. In a preferred embodiment, the user is introduced to the program's virtual facilitator who introduces the training participants to each other, explains the training rules, and assures the training program remains on schedule. The virtual facilitator is typically stored in the policy training database 130. FIG. 17 is an exemplary screen display illustrating the introduction to the facilitator according to an embodiment of the invention.

In the preferred embodiment, a maximum of 5 screen personalities can participate per training session. Block 212 is a decision block representing the policy training module 105 determining if there are less than three participants registered for a session. If so, block 220 represents the policy training module 105 determining the number of virtual personalities needed for the system; otherwise, control is passed to decision block 214. The system monitors the number of screen personalities registered for a training session. The system records each user's training session including the user's policy suggestions, individual feedback and onscreen comments provided during the training session. Block 222 the system generates a virtual personality to participate in the training session. A virtual personality may be implemented in the form of a template having fields including information copied from a user's previous training session. When the policy training module 105 determines that a virtual personality is needed for a training session, the present system may be implemented so that the module 105 launches an algorithm to generate a virtual personality to participate in the training session. The algorithm copies information from the policy recommendation database 224 stored in database 130. Block 226 represents the policy training module 105 storing the virtual personality in the database 224. The policy recommendation database 224 is comprised of policy information previously submitted by a screen personality including policy suggestions, individual feedback and onscreen comments provided during previous training sessions. Virtual personality information obtained during previous training session is retrieved from the policy recommendation database 224. The algorithm copies the policy information from the previous policy modules, positions and scripts the policy information for the present training session. Script is defined as positioning and pacing the policy information per policy module to make it appear as though it is occurring in real-time. This provides the user with a virtual personality and an interactive, simulated real-time training experience without the user being dependent upon the availability of others for interaction, discussions and training. After introductions, the user is typically prompted to click on either an agree or decline icon to indicate his understanding of the training rules and to indicate his readiness to proceed. Block 220 represents the policy training module 105 generating a policy.

Block 214 is a decision block representing the policy training module 105 determining if there are less than five screen personalities registered for the session. If so, block 216 represents the policy training module 105 dividing the participants into two sessions; otherwise, control is passed to block 220 which represents the policy training module 105 generating a policy. Block 216 represents the policy training module 105 assigning the participants a new session number.

Figure 3B:
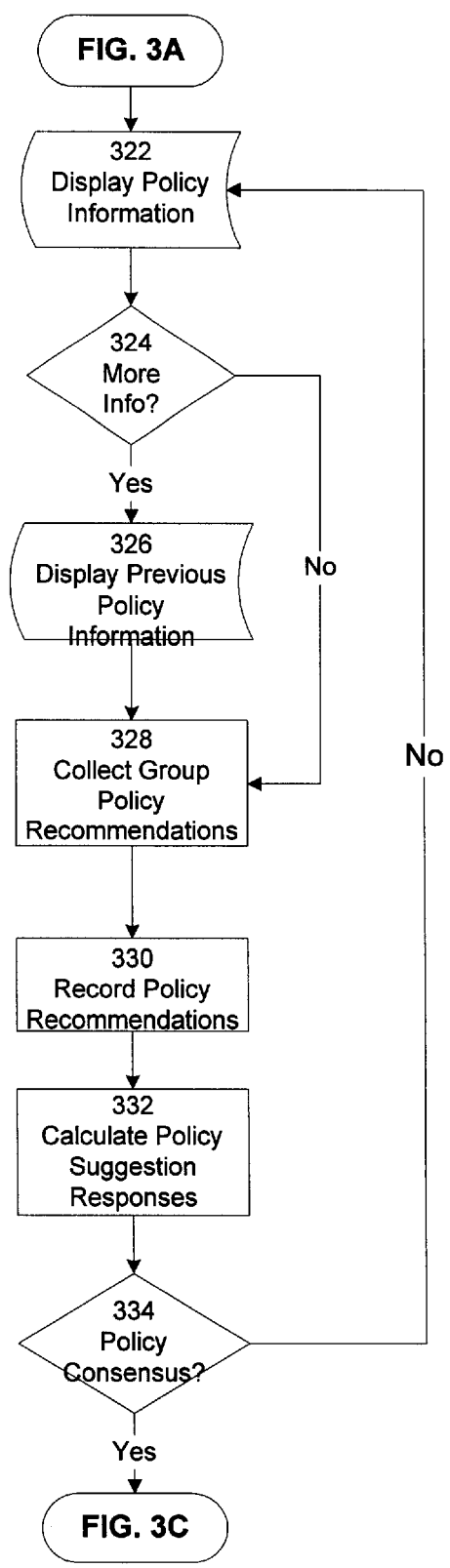
Figure 3C:
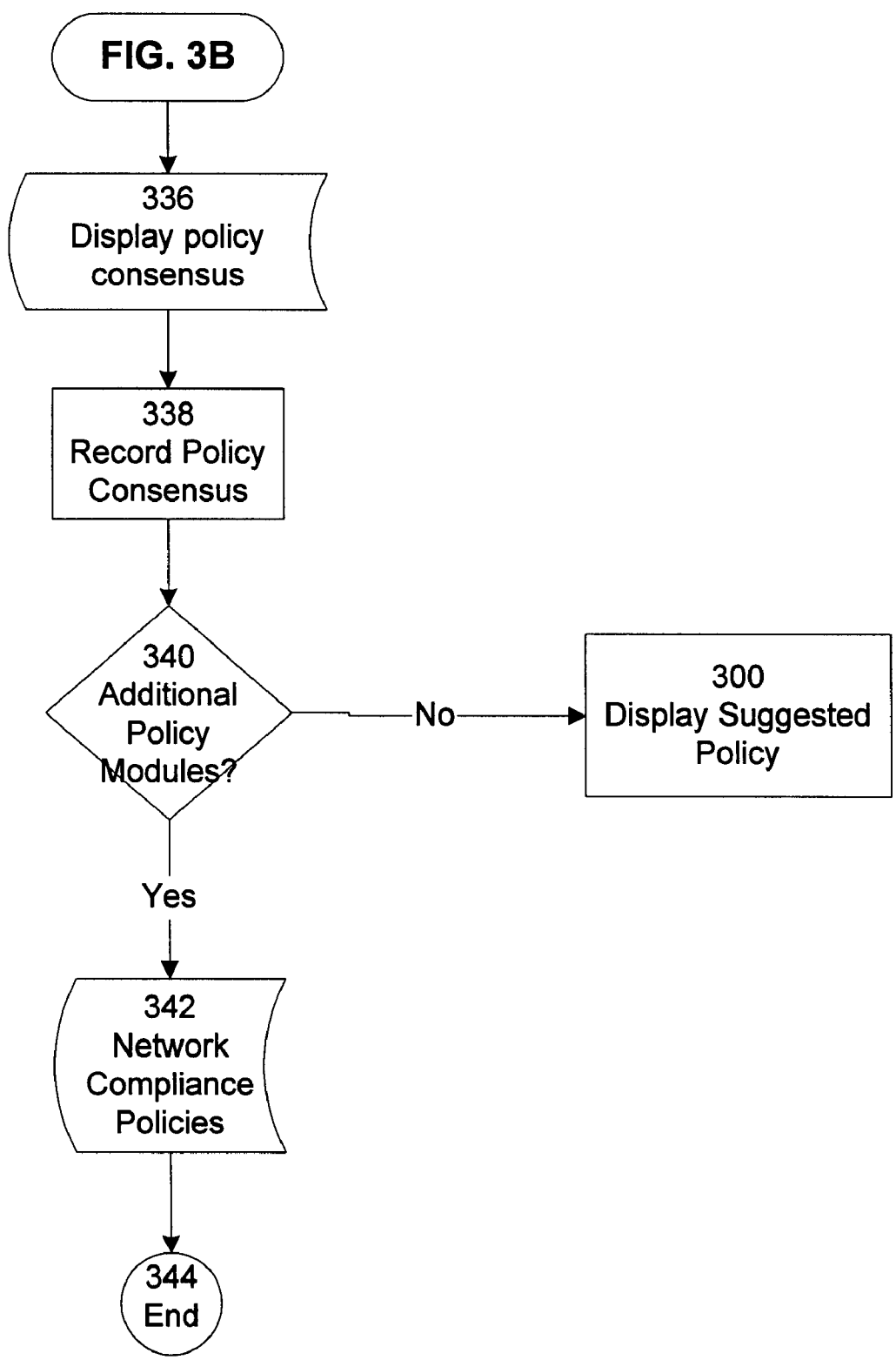

The Policy Training Process:

FIGS. 3A–3C are block diagrams further illustrating the steps performed by the policy training module 105 in performing the generating a network security policy step represented by block 220 according to an embodiment of this invention;

Block 300 represents the policy training module 105 indicating that the network user is ready to begin policy training by presenting the network users with suggested policy information.

Figure 18:
FIG. 18 is an exemplary screen display illustrating the suggested policy according to an embodiment of the invention.

Block 302 represents the policy training module 105 receiving suggested policies from the network users. FIG. 18 is an exemplary screen display illustrating the suggested policy according to an embodiment of the invention. The suggested policy information typically is stored in a policy training database 130. The user is asked to review the policy information and a policy suggestion for a limited period of time. The policy training module 105 collects a policy suggestion from each network user's policy review session.

Block 304 represents the policy training module 105 recording all individual policy recommendations.

Figure 19:
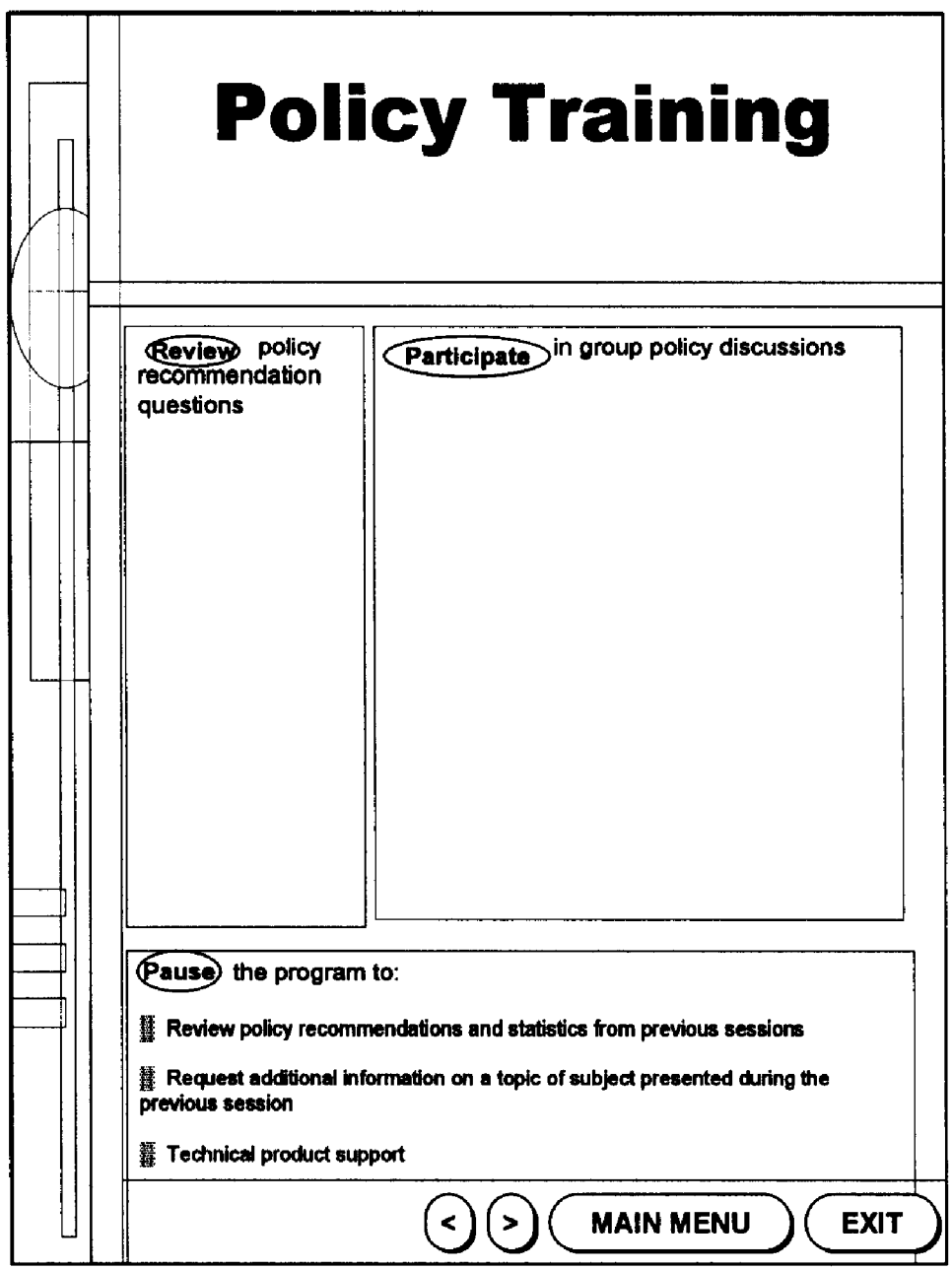
FIG. 19 is an exemplary screen display illustrating the network user discussion options according to an embodiment of the invention.

Block 306 represents the policy training module 105 prompting the network user to join a group discussion after the network user has reviewed the information on his own. The network user indicates his readiness to join the group discussion, such as by clicking an icon. The network user's signal may be sent to the other participants' screens. FIG. 19 is an exemplary screen display illustrating the network user discussion options according to an embodiment of the invention.

Block 308 represents the policy training module 105 notifying the other participants that a network user is prepared to enter the group session. Once the individual network users are ready to discuss the policy, the facilitator begins the session monologue and monitors the session's content and time.

Block 310 represents the policy training module 105 retrieving the electronic facilitator from the database 120. The electronic facilitator serves as a moderator for the training module. For example, the electronic facilitator prompts the users for input and monitors the time spent on each issue.

Block 312 represents the policy training module 105 connecting individual network users to the policy training chat room.

Blocks 314, 316 and 318 represent the individual network user computers connected to the policy chat room of the policy training module 105. One or more individual network user's policy recommendations may be displayed to the group.

Figure 20:
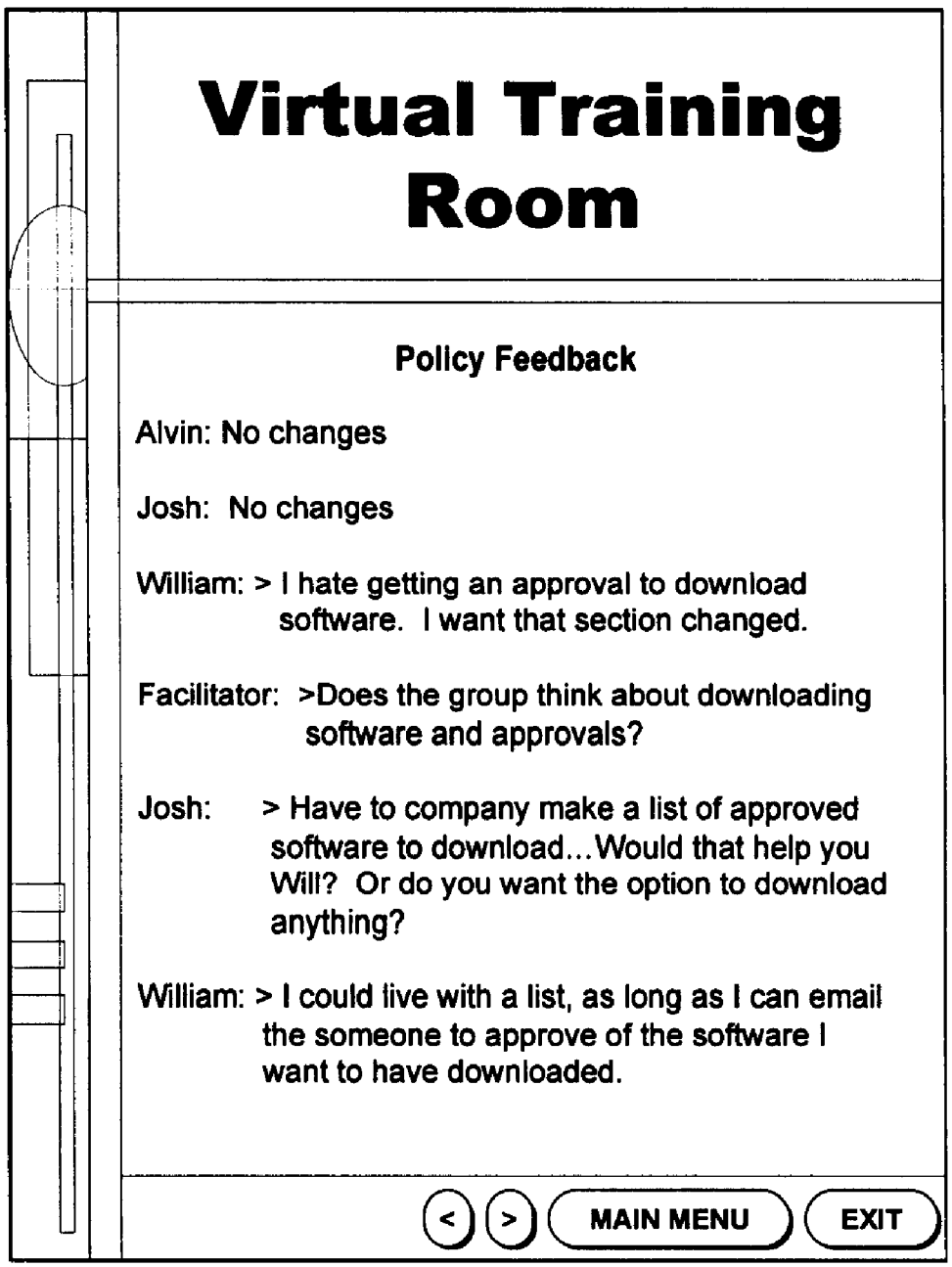
FIG. 20 is an exemplary screen display illustrating group policy discussions according to an embodiment of the invention.

Block 322 represents the policy training module 105 displaying network user policy recommendation to the group. The policy recommendations may be shown in a different color and font. FIG. 20 is an exemplary screen display illustrating group policy discussions according to an embodiment of the invention. The individual recommendations are used to develop a group policy consensus.

From the discussion, the group confers, online, to write a policy recommendation. All group participants can view the policy recommendations and group discussions from previous policy training sessions. FIG. 21 is an exemplary screen display illustrating policy writing according to an embodiment of the invention.

Figure 22:
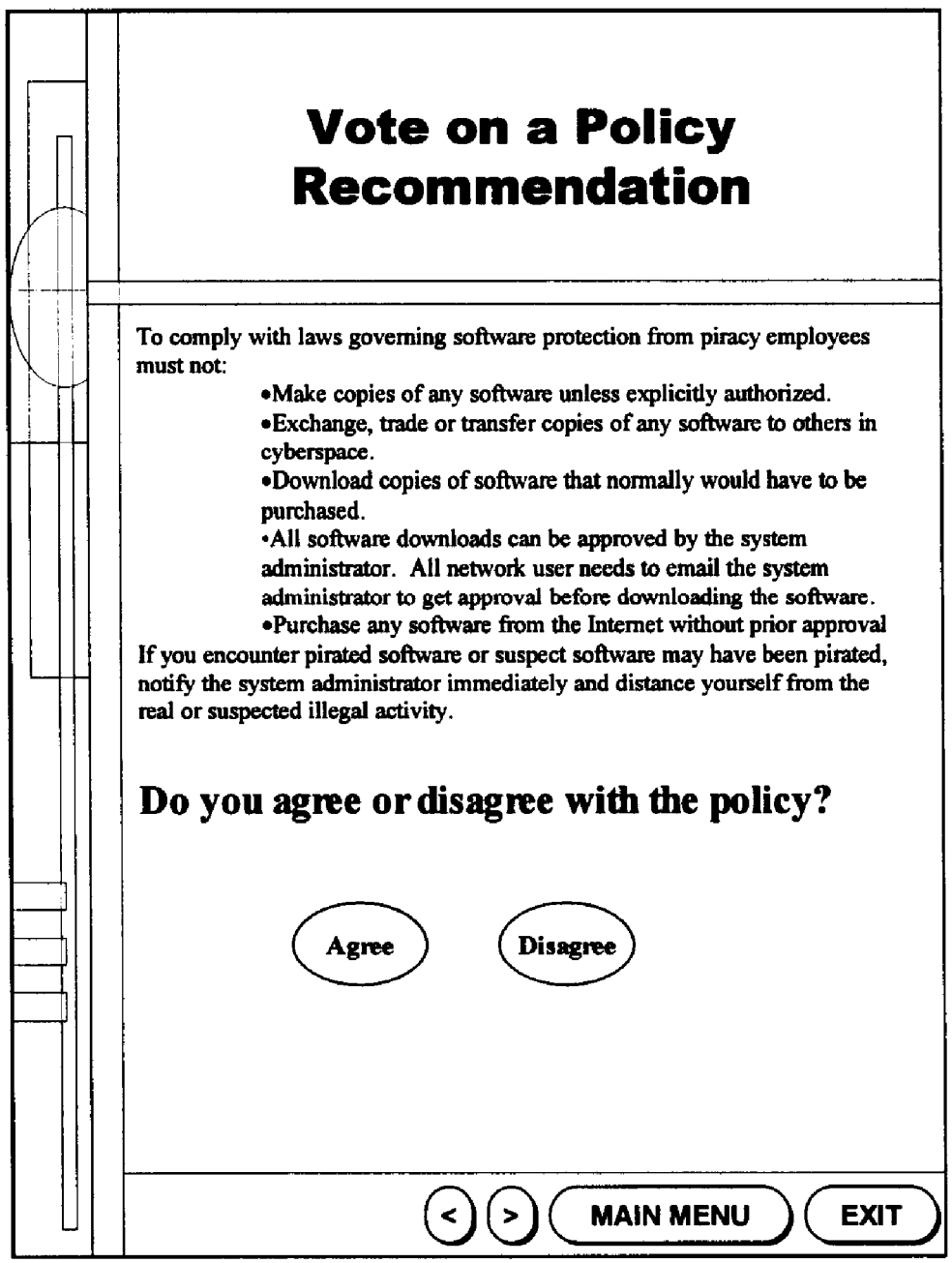
FIG. 22 is an exemplary screen display illustrating the network user discussion options according to an embodiment of the invention.

Block 324 is a decision block representing the policy training module 105 querying the user regarding whether he wants more policy information. If so, block 326 represents the policy training module 105 retrieving the policy training information and displaying it to applicable network users; otherwise block 328 represents the policy training module 105 collecting policy recommendations from the group. The group confers, online, to write a policy recommendation. The policy training module 105 collects and records all group policy recommendations. FIG. 22 is an exemplary screen display illustrating the network user discussion options according to an embodiment of the invention.

Block 330 represents the policy training module 105 recording the group policy recommendations in the policy recommendation database 224.

Block 332 represents the policy training module 105 calculating and ranking the group responses in the policy training database. For example, the policy with the most user votes may be the policy of group consensus.

Block 334 is a decision block representing the policy training module 105 determining if a policy consensus has been achieved. If so, then block 336 represents the policy training module 105 displaying the group consensus; otherwise, control typically is returned to block 322. If there is a tie for group consensus, the system requires network users to review the policy options and re-vote. Each user's policy information is displayed the group reconsiders their recommendations and attempts to come to a group policy consensus.

The process illustrated in blocks 322 through 334 is repeated until a group policy consensus is achieved.

Figure 23:
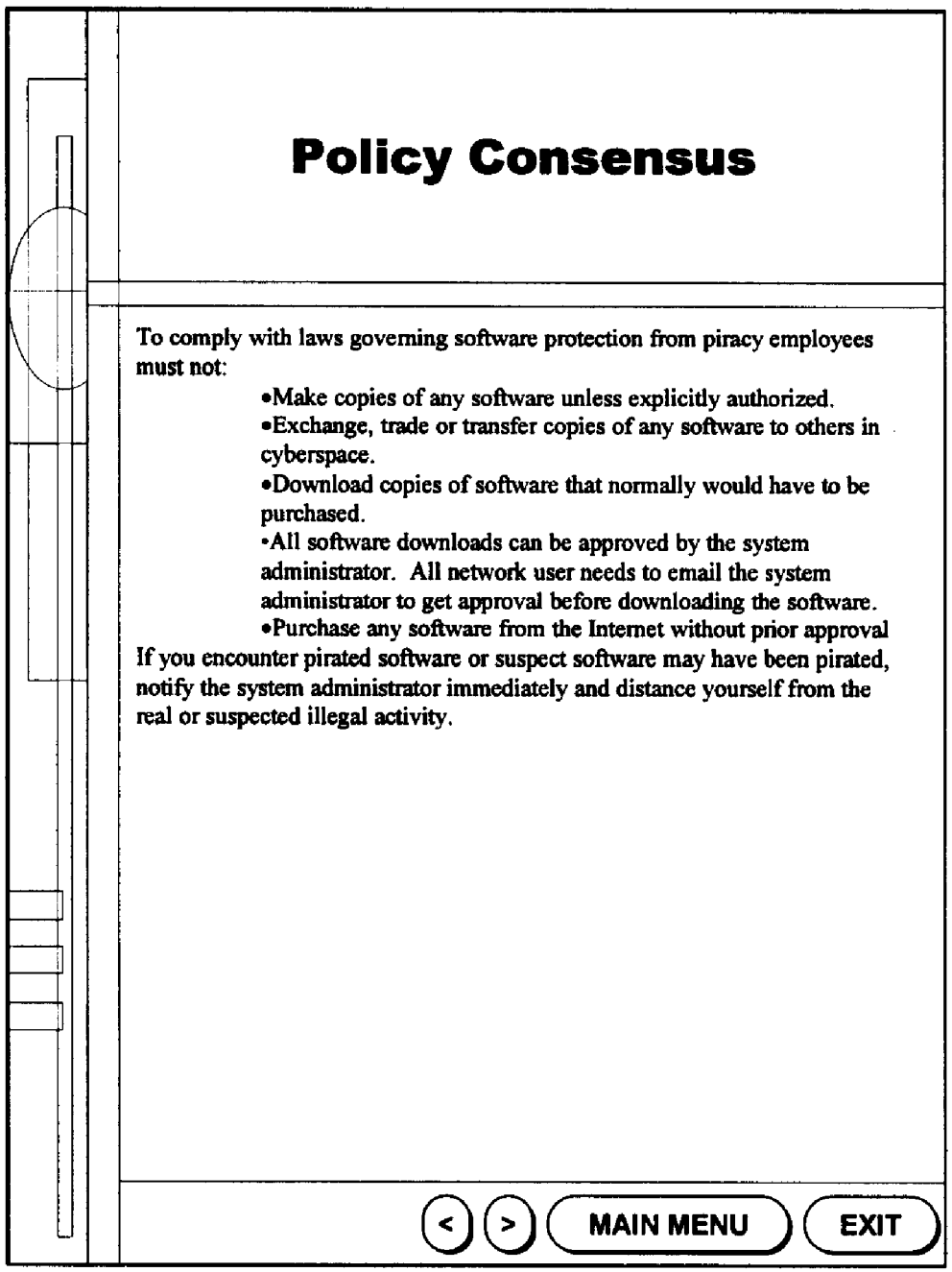
FIG. 23 is an exemplary screen display illustrating the policy consensus according to an embodiment of the invention.

Block 336 represents the policy training module 105 displaying policy consensus. FIG. 23 is an exemplary screen display illustrating the policy consensus according to an embodiment of the invention.

Block 338 represents the policy training module 105 recording the policy consensus. The process of developing a consensus policy is repeated until all of the policy modules have been reviewed and addressed.

Block 340 is a decision block representing the policy training module 105 determining if there are no additional policy modules to complete.

If so, block 300 represents a repeat of the policy generation process; otherwise, block 342 represents the policy training module 105 presenting a suggested policy to the network user and assembling and recording the group consensus policies from each policy module.

The policy training module 105 assembles and records the group consensus policies from each policy module in the network security policy database 130.

Block 344 represents the end of the policy generation process of the policy training module 105.

Figure 24:
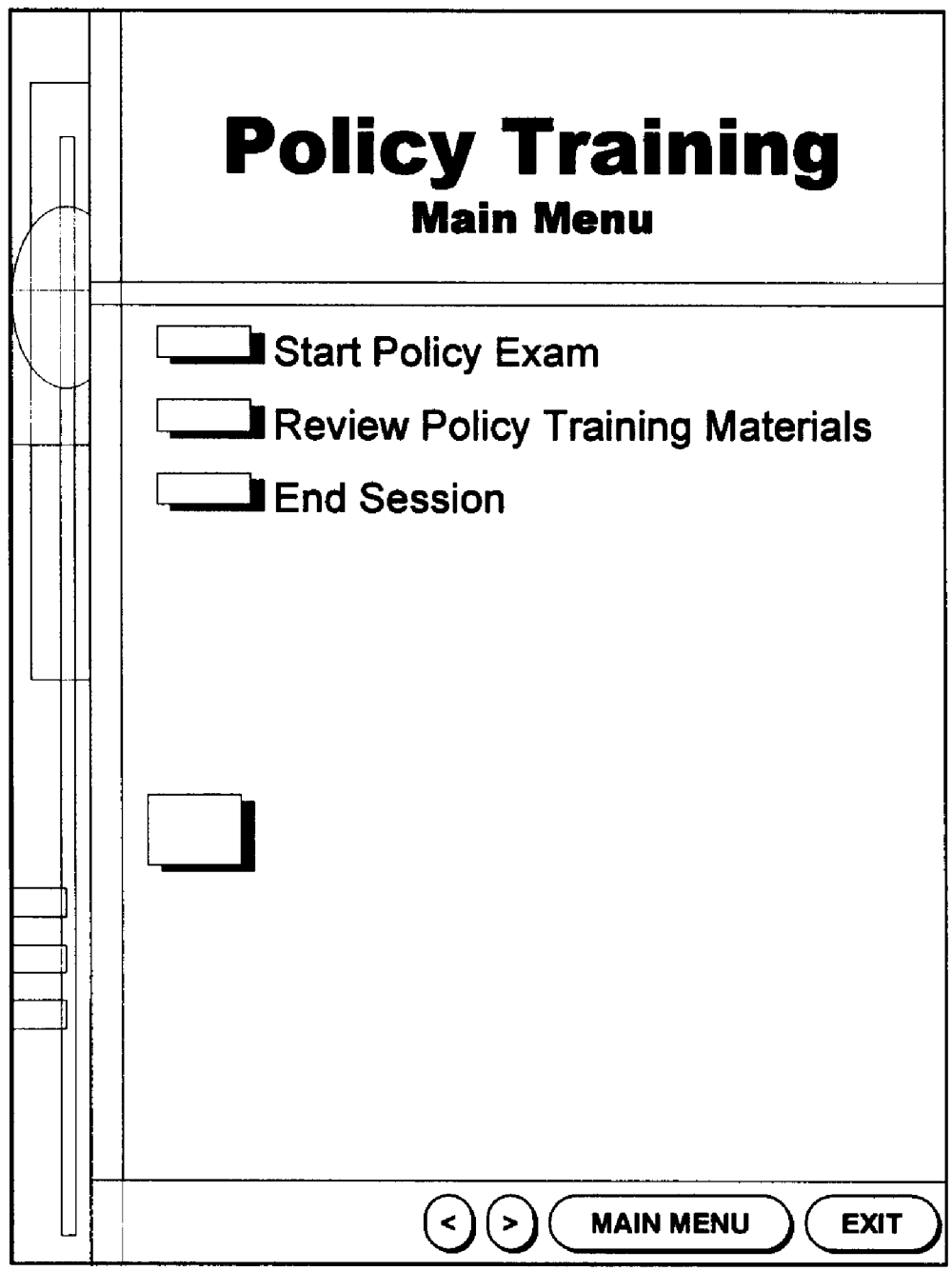
FIG. 24 is an exemplary screen display illustrating the policy training options according to an embodiment of the invention.

When the training session is completed, the network user is given the options to start the policy exam, review policy training materials, or end the session. FIG. 24 is an exemplary screen display illustrating the policy training options according to an embodiment of the invention.

Start the Policy Exam

FIG. 4 is a block diagram further illustrating the steps performed by the policy training module in administering a policy training exam according to an embodiment of the present invention. The network user is given an online policy exam to reinforce the information presented in the policy training session.

Block 400 represents the policy training module 105 receiving a request for a policy training exam from the network user.

Figure 25:
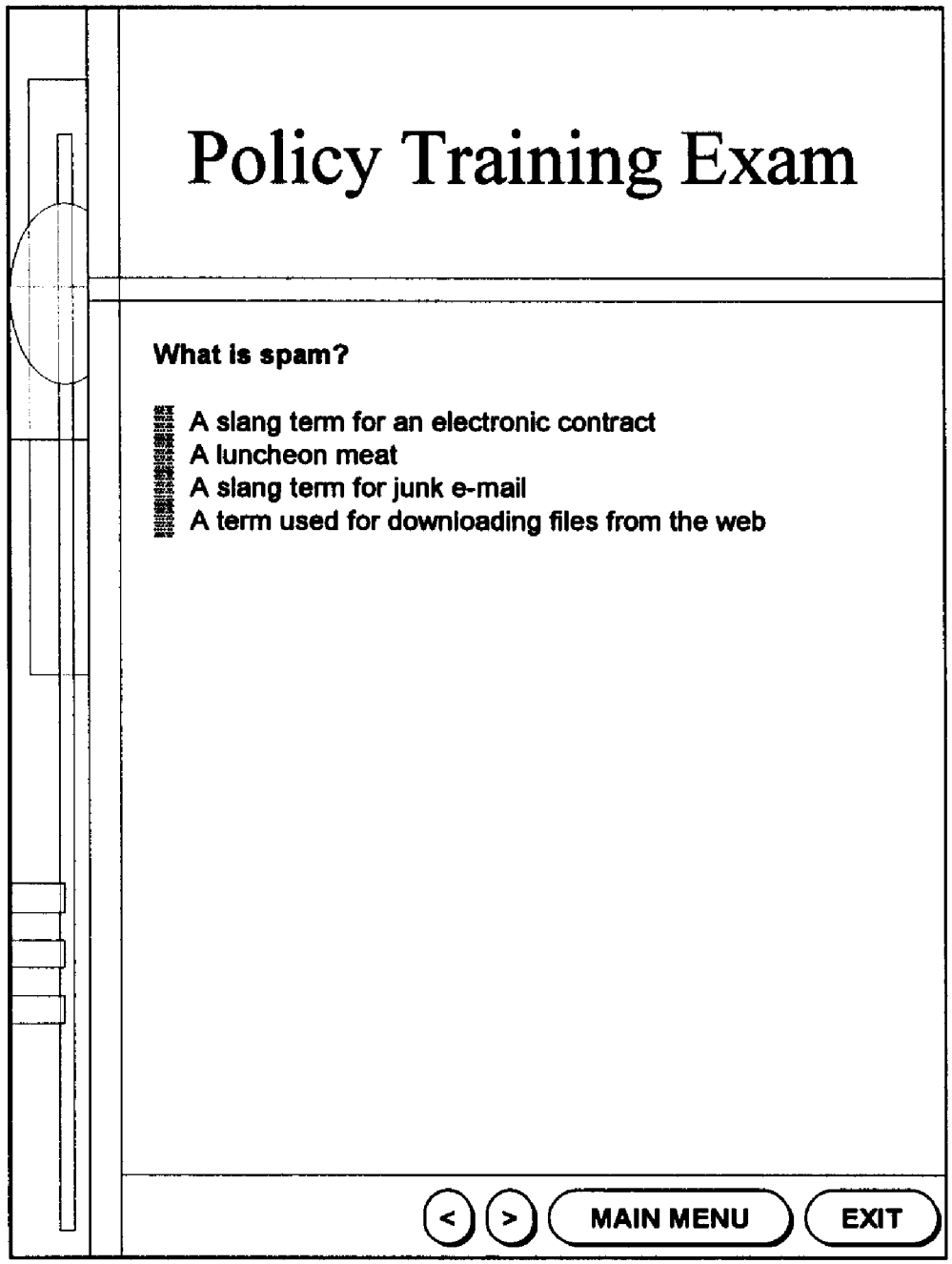
FIG. 25 is an exemplary screen display illustrating the policy exam according to an embodiment of the invention.

Block 402 represents the policy training module 105 retrieving a policy exam from the policy training database 130 and presenting it to the network user. FIG. 25 is an exemplary screen display illustrating the policy exam according to an embodiment of the invention. Once the network user completes the exam, he is prompted to send the exam to policy effectiveness 120 where the information regarding the user's taking of the exam is recorded.

Block 404 represents the policy training module 105 receiving the exam answers from the network user and tabulating the network user's score. During the exam tabulation period, the network user is asked to fill out a policy training feedback and evaluation form.

Block 406 represents the policy training module 105 retrieving a policy training feedback and evaluation form from the policy training database 130 and sending it to the network user. FIG. 26 is an exemplary screen display illustrating a training feedback and evaluation form according to an embodiment of the invention. The network user completes the policy training feedback and evaluation form and returns it to the policy training module 105.

Block 408 represents the policy training module 105 storing the policy training feedback and evaluation form in the User's Profile database 150.

Block 410 represents the policy training module 105 sending the network user his exam score after the feedback and evaluation form is completed.

Figure 27:
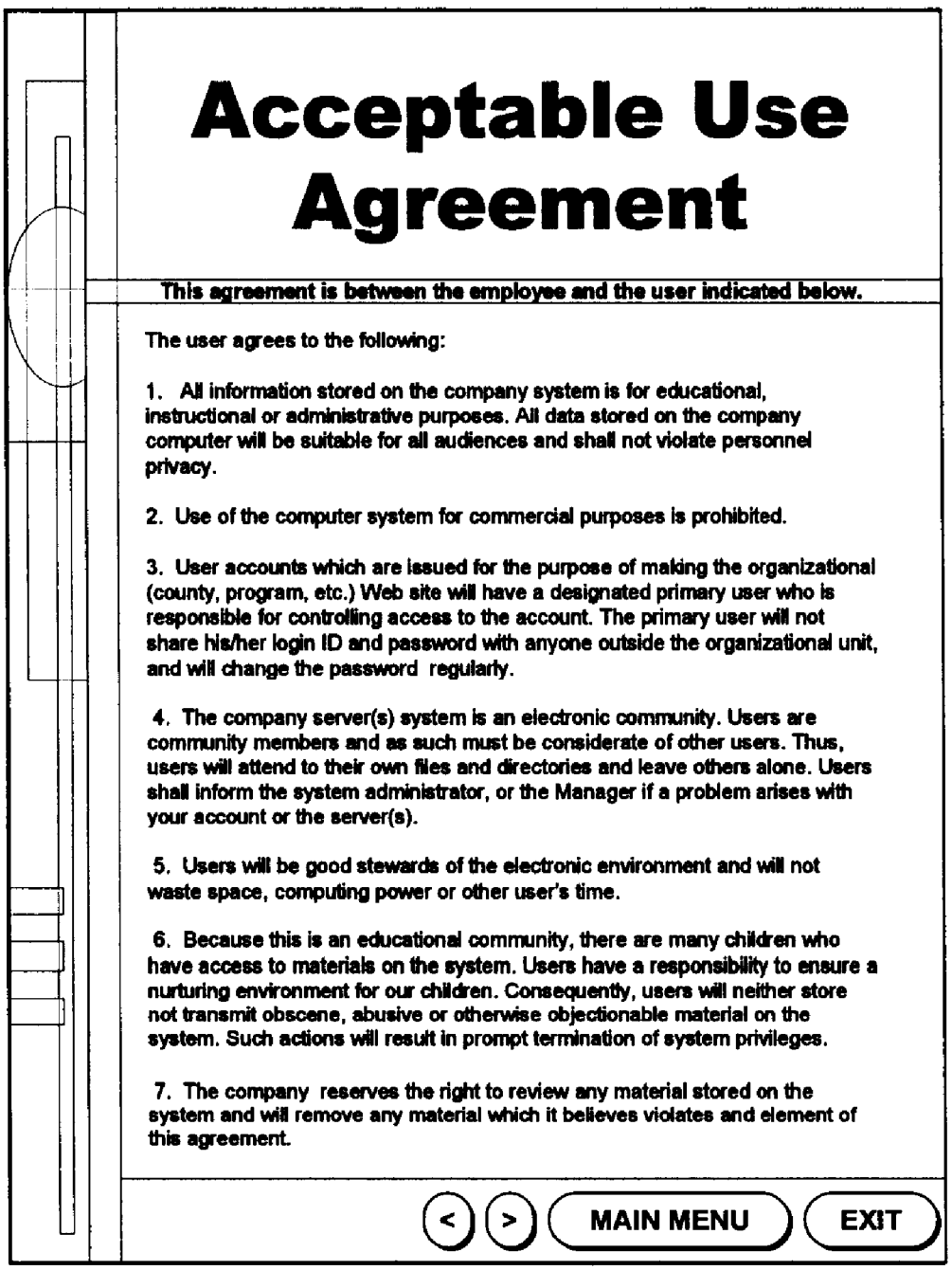
FIG. 27 is an exemplary screen display illustrating an Appropriate Use Agreement/Employee Agreement form according to an embodiment of the invention.

After the employee completes the policy building session, the policy training module 105 may request that the user sign an Appropriate Use Agreement/Employee Agreement designed to limit the organization's liability. FIG. 27 is an exemplary screen display illustrating an Appropriate Use Agreement/Employee Agreement form according to an embodiment of the invention. FIG. 28 is an exemplary screen display illustrating an Appropriate Use Agreement/Employee Agreement form according to an embodiment of the invention. Block 412 represents the policy training module 105 sending the network user an Appropriate Use Agreement/Employee Agreement. The user reads and signs the Agreement. The user returns the Agreement to the policy training module 105. The signed Agreement is kept in the User Profile database 200 and a copy is emailed to the user for his records.

Block 414 represents the policy training module 105 receiving the Agreement and storing it in the User Profile 150.

Block 416 represents the policy training module 105 sending an email message to the network user with a copy of the Agreement attached.

Figure 29:
FIG. 29 is an exemplary screen display illustrating the end of the training according to an embodiment of the invention.

Block 418 represents the end of the policy exam process. FIG. 29 is an exemplary screen display illustrating the end of the training according to an embodiment of the invention. If the user fails the exam, the policy training module 105 will ask him if he wants to retake the exam, review policy training materials, or end the session.

Policy Compliance Monitor 110

The Policy Compliance Monitor 110 works with the Policy Effectiveness Module 120 to provide network user compliance monitoring with network security policy stored in a database, it electronically evaluates network security policy compliance based on network user compliance, and undertakes a network policy compliance action in response to network security policy compliance. Network user compliance monitoring is defined as monitoring network activity to insure users are in compliance with the organization's network security policies. Network security policy is a set of rules designed to limit an organization's risk and liability.

Figure 5:
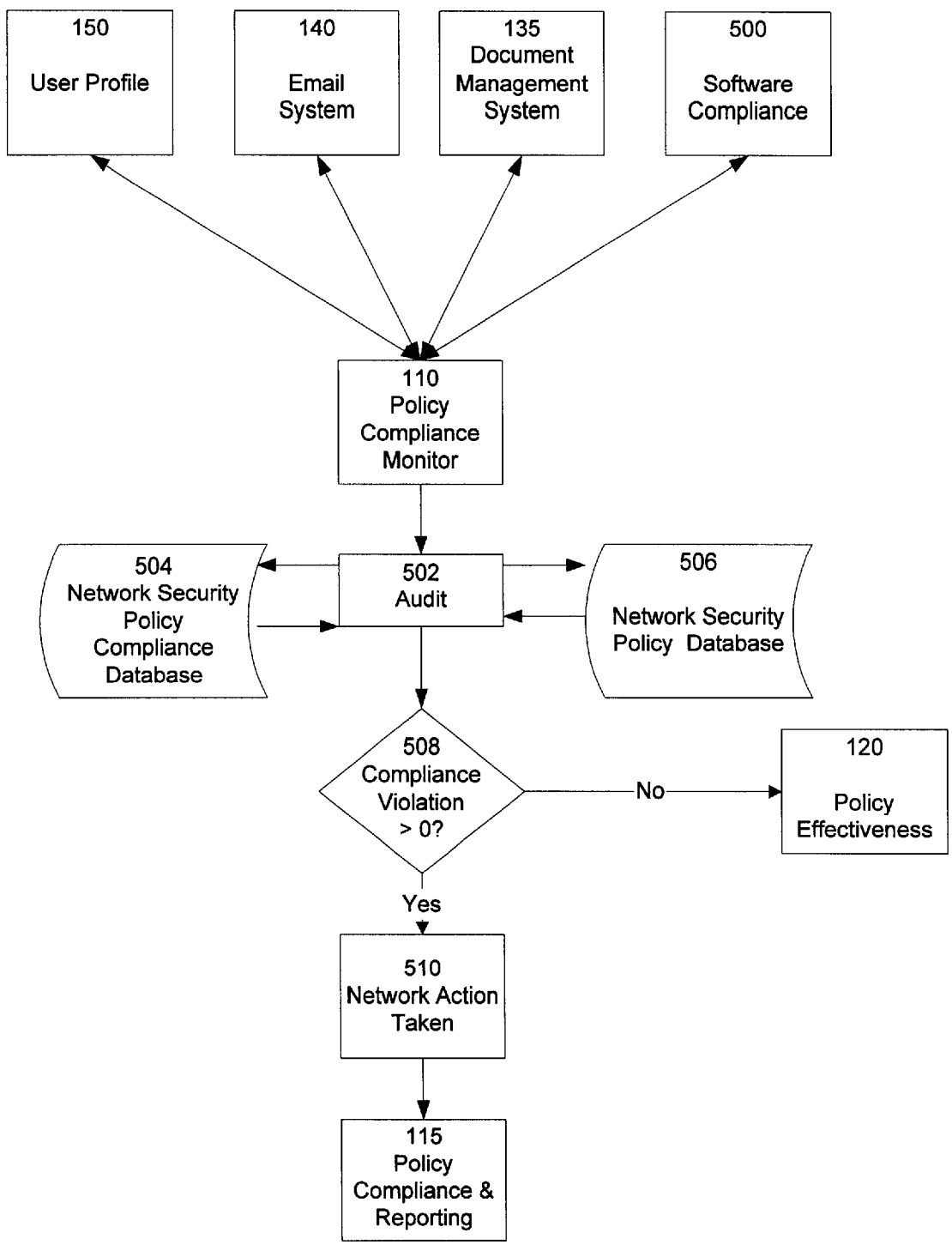
FIG. 5 is a block diagram further illustrating the operation of a policy effectiveness system according to an embodiment of this invention.

FIG. 5 is a block diagram further illustrating the operation of the policy effectiveness system according to an embodiment of this invention.

Figure 30:
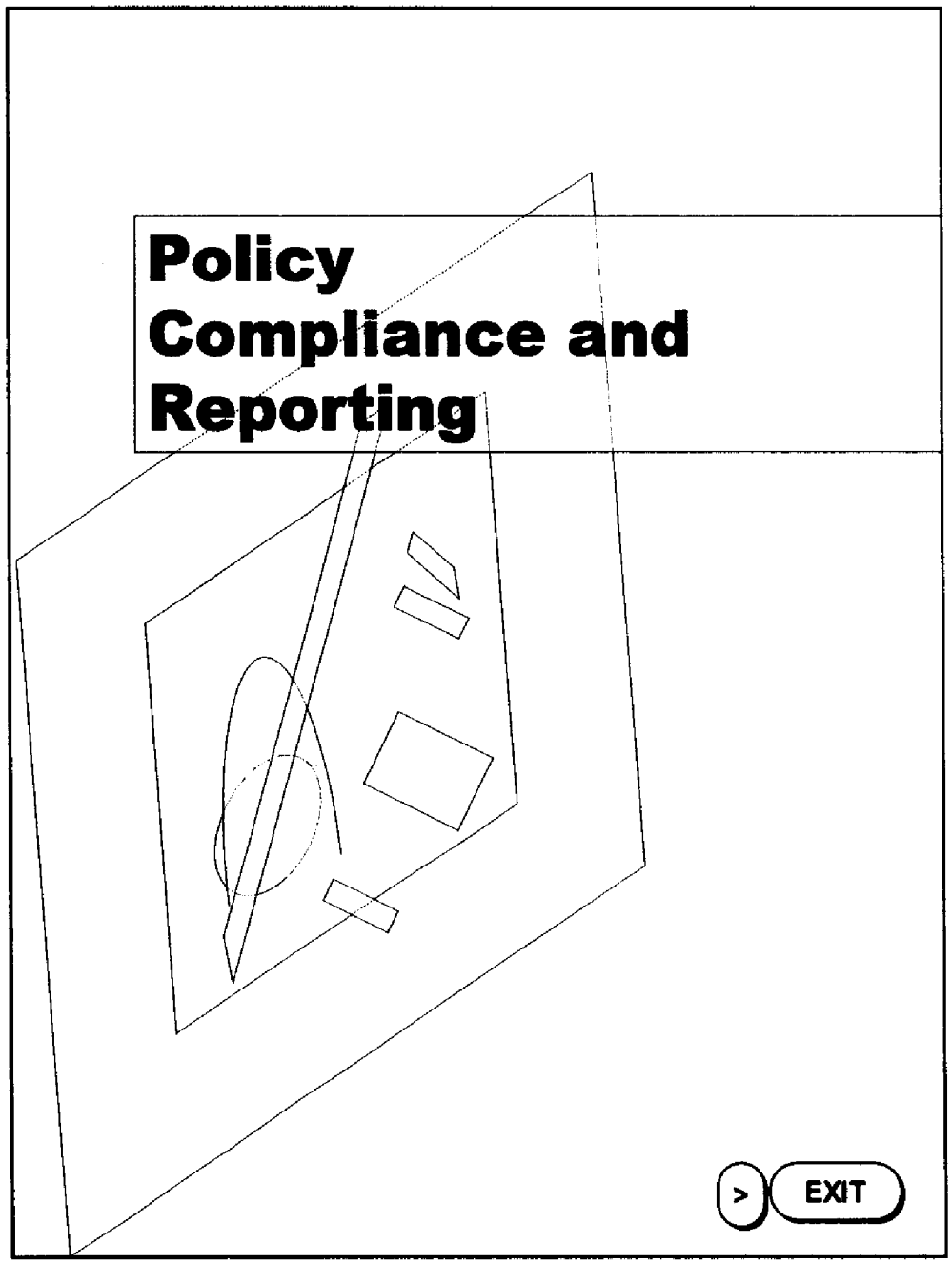
FIG. 30 is an exemplary screen display illustrating the policy compliance and reporting according to an embodiment of the invention.

The policy compliance monitor oversees user profile, email compliance, internet compliance, document management and software compliance functions to collect network user security policy compliance activities. FIG. 30 is an exemplary screen display illustrating the policy compliance and reporting according to an embodiment of the invention.

Block 110 represents the policy compliance monitor of the policy effectiveness system 100.

Block 150 represents the user profile module of the policy effectiveness system 100. The user profile module 150 is a database comprised of information about network users. For example, the user profile module 150 may contain information about network user policy compliance history, employment history, and network identification information. FIG. 31 is an exemplary screen display illustrating the User Profile according to an embodiment of the invention.

Figure 32:
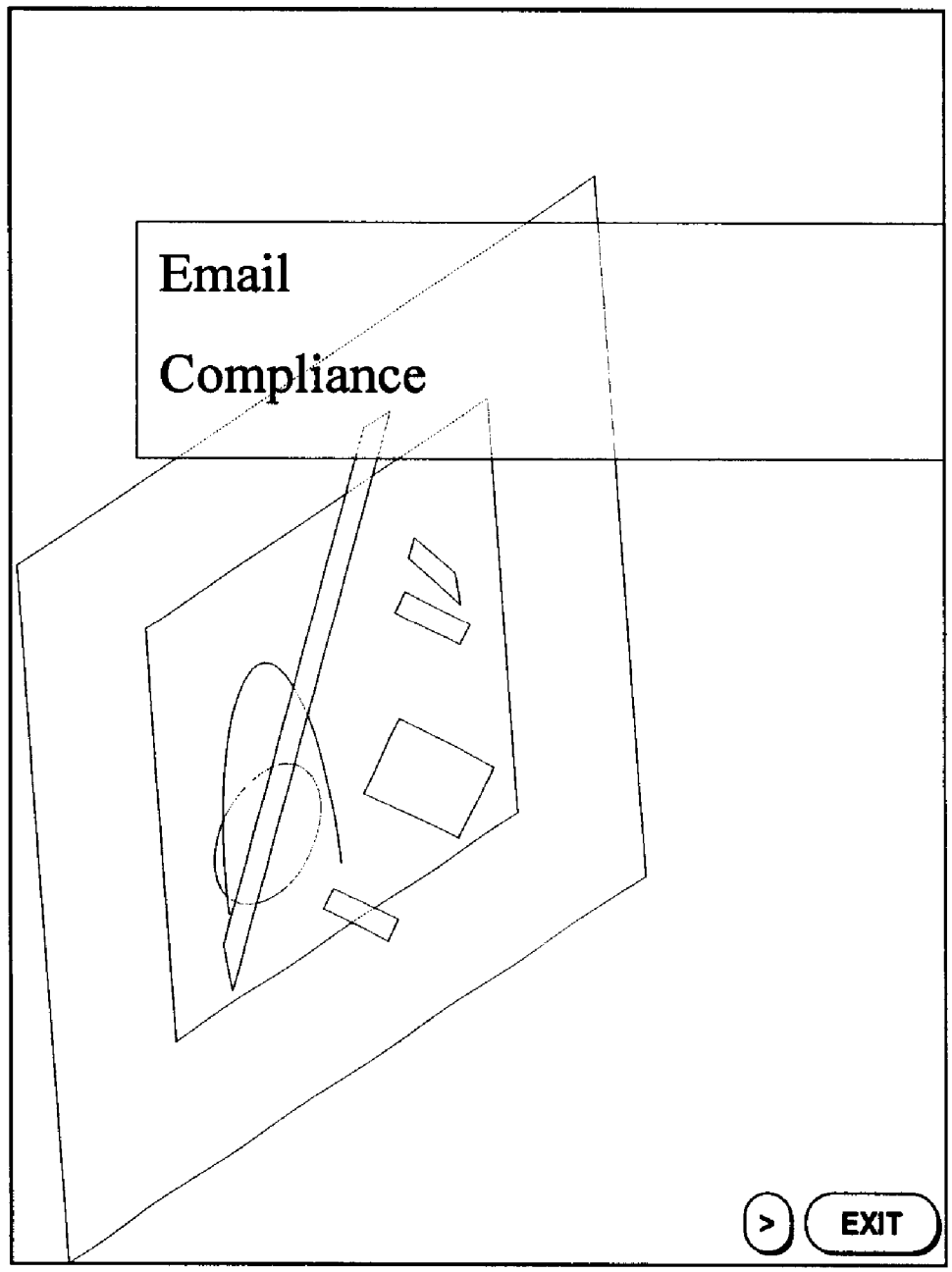
FIG. 32 is an exemplary screen display illustrating Email Compliance according embodiment of the invention.

Block 140 represents the email compliance module of the policy effectiveness system 100. The email compliance module 140 collects information on network users' email use activity. FIG. 32 is an exemplary screen display illustrating email compliance according to an embodiment of the invention.

Figure 33:
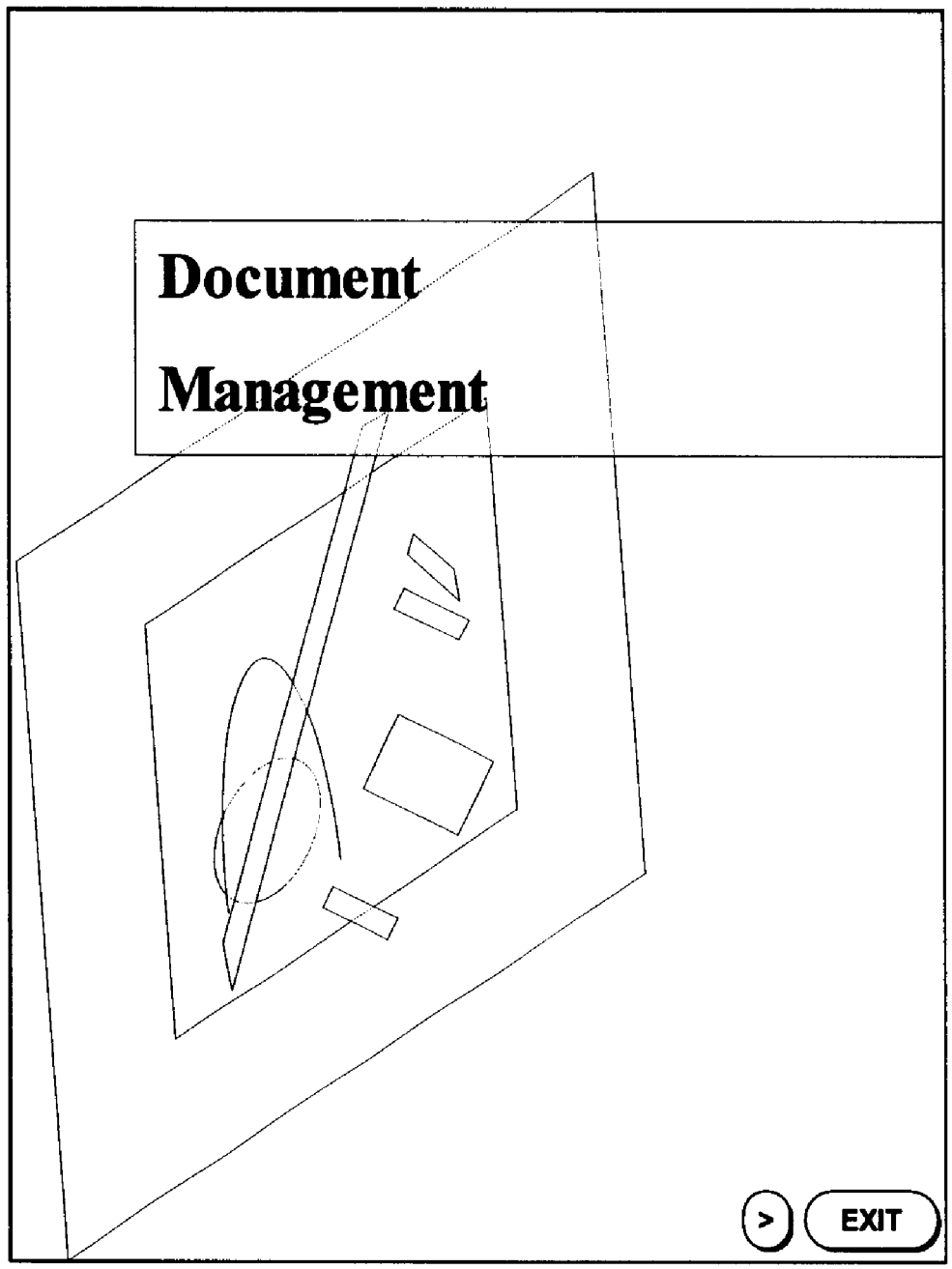
FIG. 33 is an exemplary screen display illustrating Document Management according to an embodiment of the invention.

Block 135 represents the document management module of the policy effectiveness system 100. FIG. 33 is an exemplary screen display illustrating Document Management according to an embodiment of the invention. The document management module 135 collects information on documents in the system. This may include document history, document authenticity, network user access to documents, and document access and disclosures.

Figure 34:
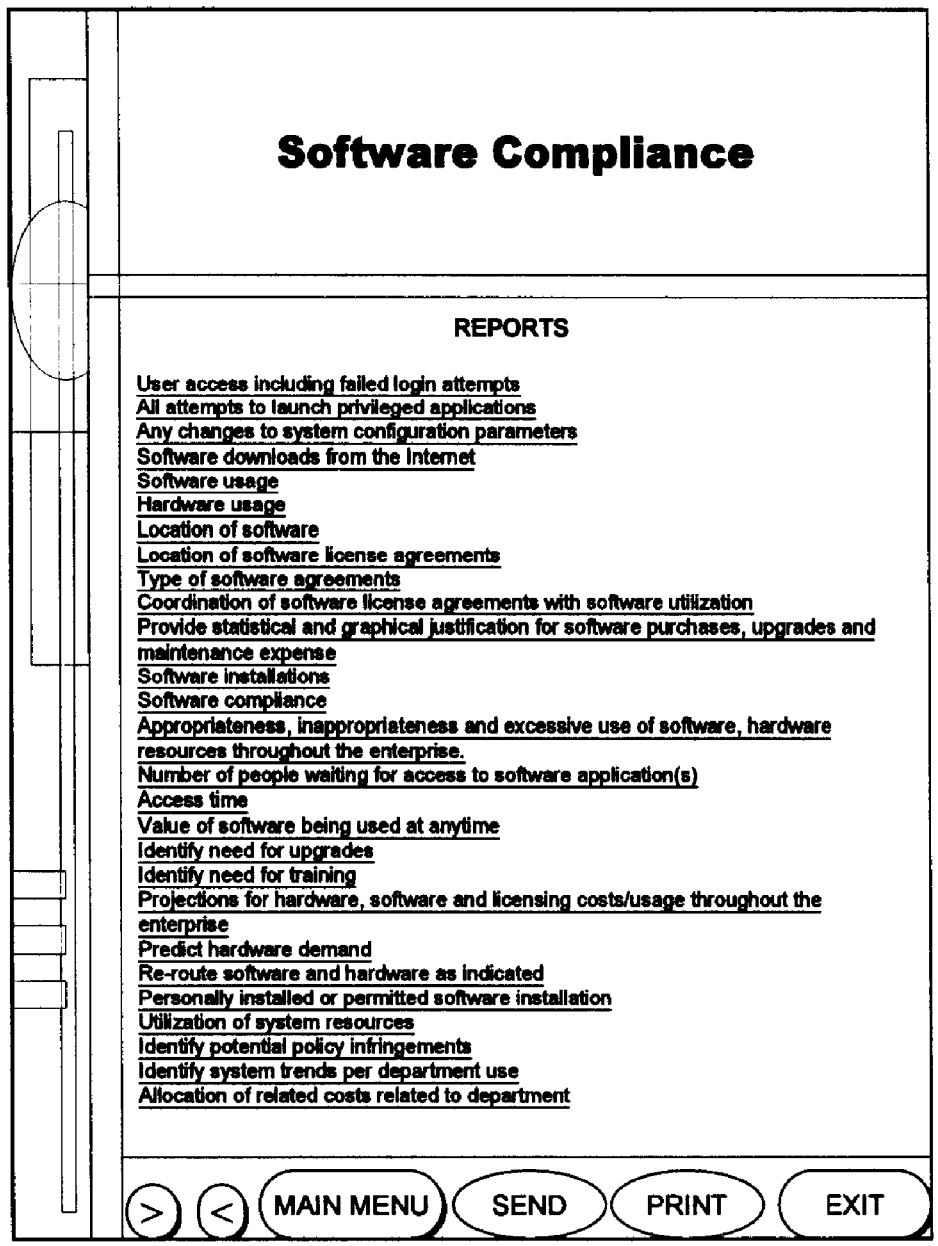
FIG. 34 is an exemplary screen display illustrating Software Compliance according to an embodiment of the invention.

Block 500 represents the software compliance module of the policy effectiveness system 100. The software compliance module 500 collects information on how network users utilize software on the network. FIG. 34 is an exemplary screen display illustrating Software Compliance according to an embodiment of the invention.

Block 502 represents the audit function of the policy effectiveness system 100. The audit function collects information from all of the policies monitored by the policy compliance monitor 110. Each monitored policy is assigned a value representing a target baseline compliance level for network policy compliance ("network policy compliance"). In the preferred embodiment, the numeric value assigned to each monitored policy is 95, representing that for each policy 95% user compliance is required. Each network user compliance activity has a numeric value the system monitors representing a target baseline compliance level for user policy compliance ("user policy compliance").

Block 504 represents the network security policy compliance database of the database 130. The baseline compliance level assigned to each monitored policy is stored in the network security policy compliance database 504 of the database 130. The audit function is responsible for reviewing network user compliance and network security policy.

Figure 35:
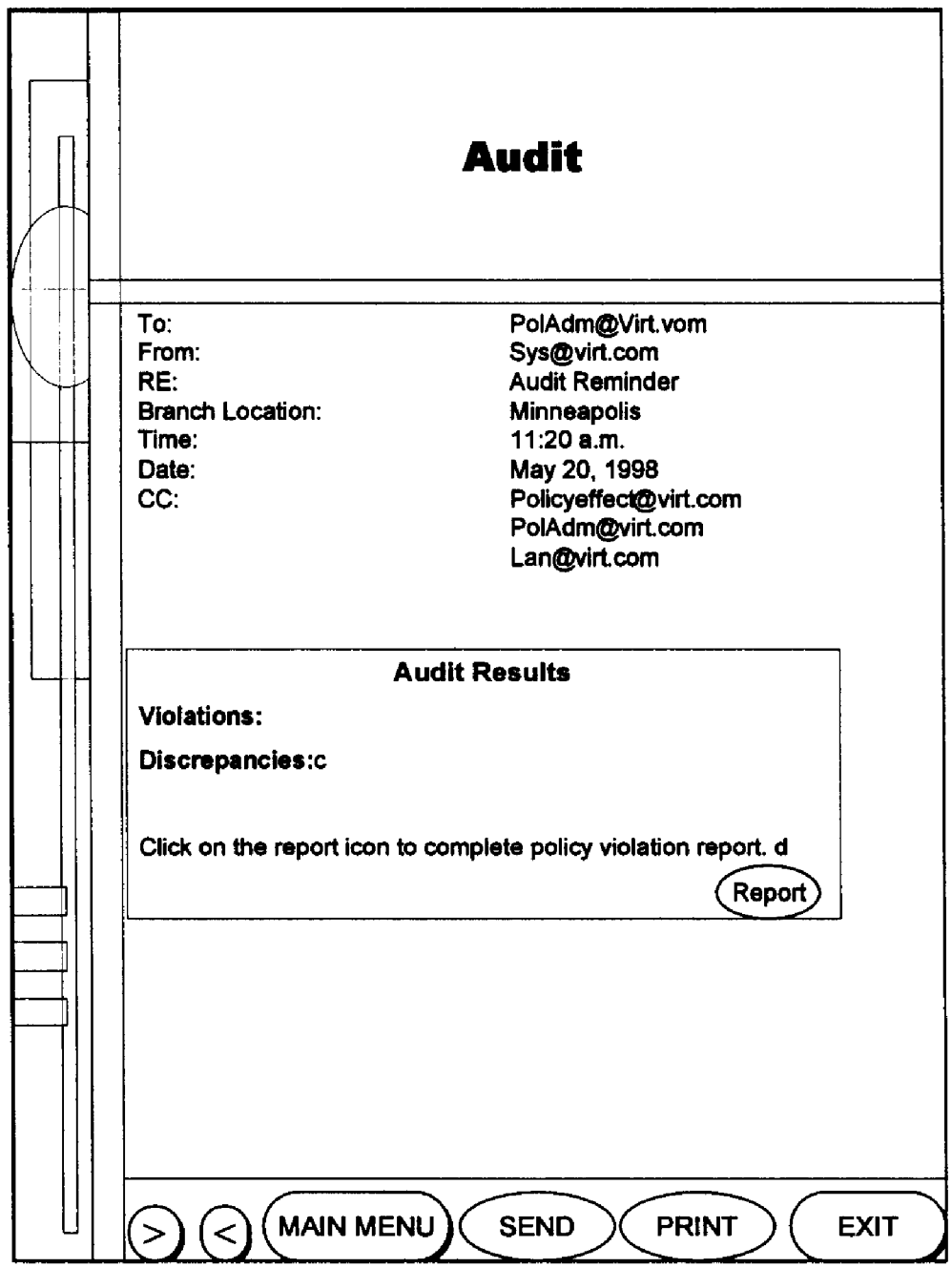
FIG. 35 is an exemplary screen display illustrating the audit function according to an embodiment of the invention.

FIG. 35 is an exemplary screen display illustrating the audit function according to an embodiment of the invention. Block 506 represents the network security policy database. The network compliance value is monitored in relation to the user compliance value stored in the network security policy database 506.

Block 508 is a decision block representing the policy effectiveness system 100 analyzing the network policy compliance value in relation to the user compliance policy value. If the user policy compliance value is greater than or equal to the network policy compliance value, then block 120 represents the policy effectiveness system notifying the policy effectiveness module 120 that the network is in compliance. Otherwise, if the network policy compliance value is greater than the user policy compliance value, the policy compliance monitor 110 measures the difference between the network policy compliance value and the user policy compliance value and undertakes a network compliance action in response to that difference. Alternatively, the policy compliance monitor could undertake a network a compliance action anytime a policy violation occurred.

Figure 36:
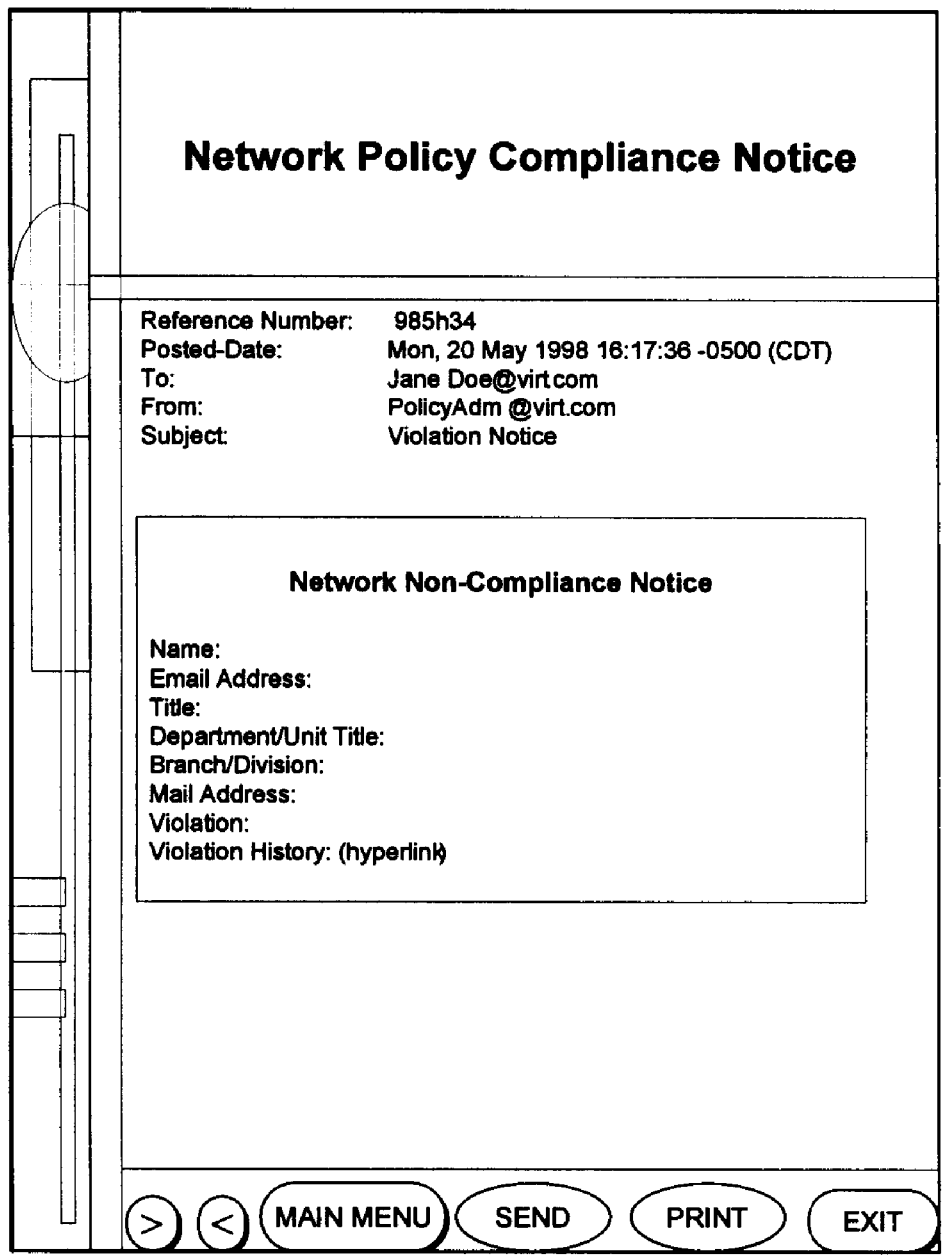
FIG. 36 is an exemplary screen display illustrating Network Non-Compliance Notice according to an embodiment of the invention.

FIG. 36 is an exemplary screen display illustrating Network Non-Compliance Notice according to an embodiment of the invention. Each policy is associated with a corresponding group of network policy compliance actions ranging from a mild (e.g., notifying a network user), level two (e.g. notifying the network user and a policy administrator), level three (e.g., providing a retraining module to a network user, restricting a network user's network access rights) and a level four action (e.g., restricting the network user's network access rights.) Each compliance action in the group is assigned a value related to a numeric value that may be reported from monitoring network user compliance. The numeric value assigned is based on the severity of the network policy compliance violation, i.e. the difference between the network policy compliance value and the user policy compliance value.

Upon recording the difference between the network policy compliance value and the user policy compliance value, the policy compliance and reporting module 115 records this information in the network security policy database 506 and begins undertaking the appropriate network compliance action.

For example, an organization may have a personal email use policy. The personal email use policy may limit each user to sending a maximum of 20 personal email messages per day. The system assigns the numeric value of 95 to the personal email messages policy. A value of 100 is the optimum network policy compliance value. The compliance monitor collects information on network user compliance for personal email use. If an individual sends 25 email messages, the system records a user policy compliance value of 90. The user policy compliance value of 90 is compared to the network policy compliance value of 100. The difference of 5 (95–90) indicates to the policy effectiveness system 100 that a network policy compliance action may be taken. In this example, a network user compliance value of 5 may tell the system to execute a network compliance action.

Figure 37:
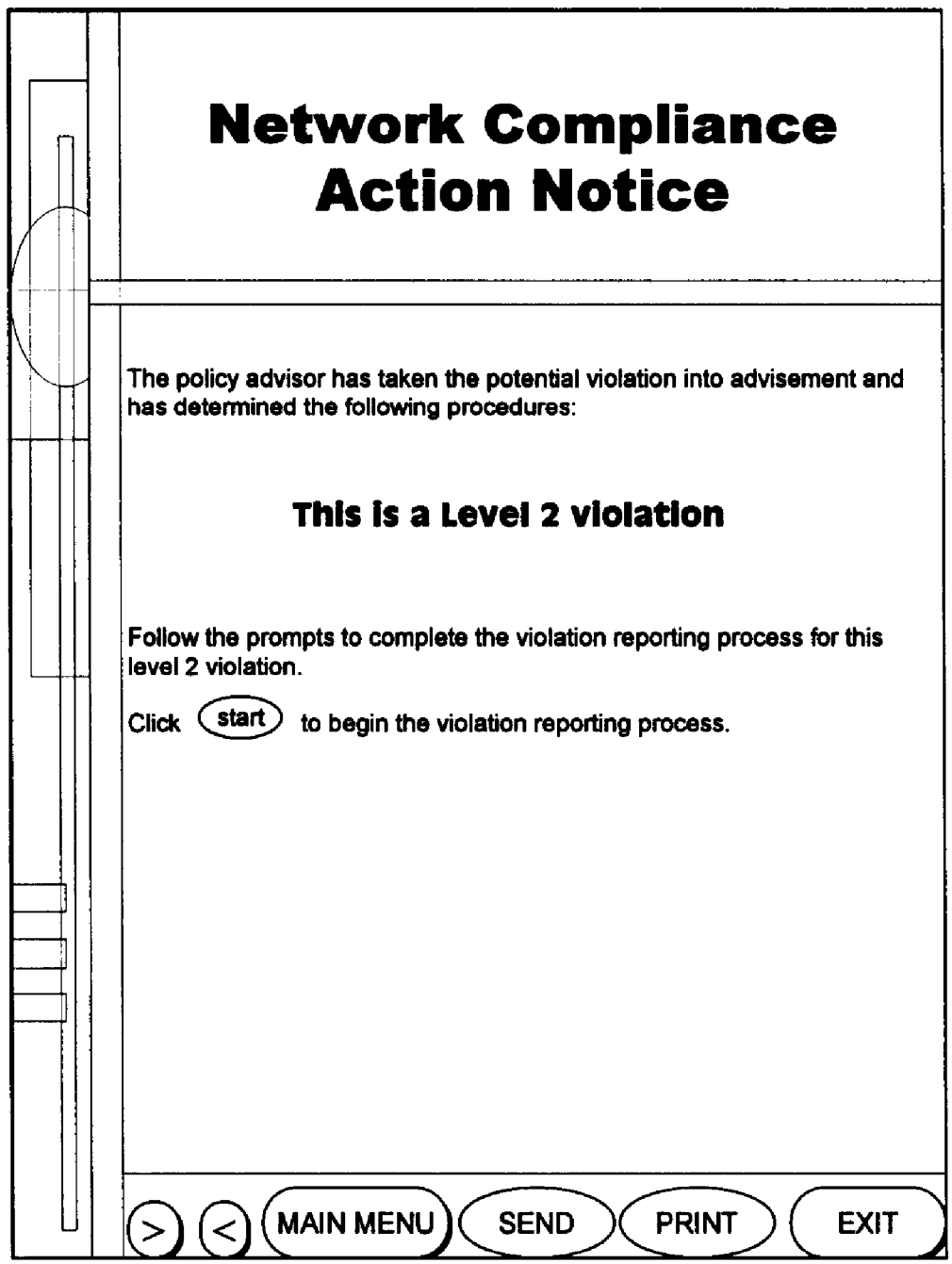
FIG. 37 is an exemplary screen display illustrating a Network Compliance Action Notice according to an embodiment of the invention.

In the preferred embodiment, the system has four action levels. Each action level may be undertaken in response to a range of differences in compliance values. FIG. 37 is an exemplary screen display illustrating a Network Compliance Action Notice according to an embodiment of the invention.

At a first action level, the system may send an email notifying the network user to cease and desist the non-compliant activity.

At a second action level, the system may prompt the system administrator to follow screen prompts to initiate procedures for the infraction. The policy effectiveness system 100 notifies the network user and a system administrator. Email and surface mail are automatically sent to the alleged violator and the system administrator. The message may ask the alleged violator to discontinue the inappropriate behavior or to reread the Intranet-base Policy Manual. The policy effectiveness system 100 records if the user visits the electronic site of the Policy Manual.

At a third action level, the policy effectiveness system 100 may file a policy violation report and launch an investigation. The policy effectiveness system 100 sends email and surface mail to the alleged violator and the system administrator informing them of the violation. A policy retraining module may be the most likely course of action. At the third action level, the actions of the second infraction are initiated and additionally an immediate referral is made to the appropriate policy officer for review and action.

At the fourth action level, the policy effectiveness system 100 may restrict the network user's network access rights and prompt the system administrator to either begin investigation procedures and/or initiate a signal to the policy knowledge base to determine the recommended course of action.

Block 510 represents the policy effectiveness system 100 undertaking a network policy compliance action. The policy effectiveness system 100 sends a signal to policy compliance and reporting 115 to record the non-compliant network user activity.

Policy Compliance and Reporting 115

The policy compliance and reporting module 115 provides automated policy monitoring, policy violation procedures and reporting, it tracks policy investigations and generates policy investigation reports. These procedures work in conjunction with existing policy compliance reporting, discipline and grievance procedures to uphold the organization's technology policies.

Compliance

The policy compliance and reporting 115 monitors and records user and network system activities audit procedures and reporting, policy violation procedures/investigations/reporting, compliance/non-compliance status reporting.

Figure 6:
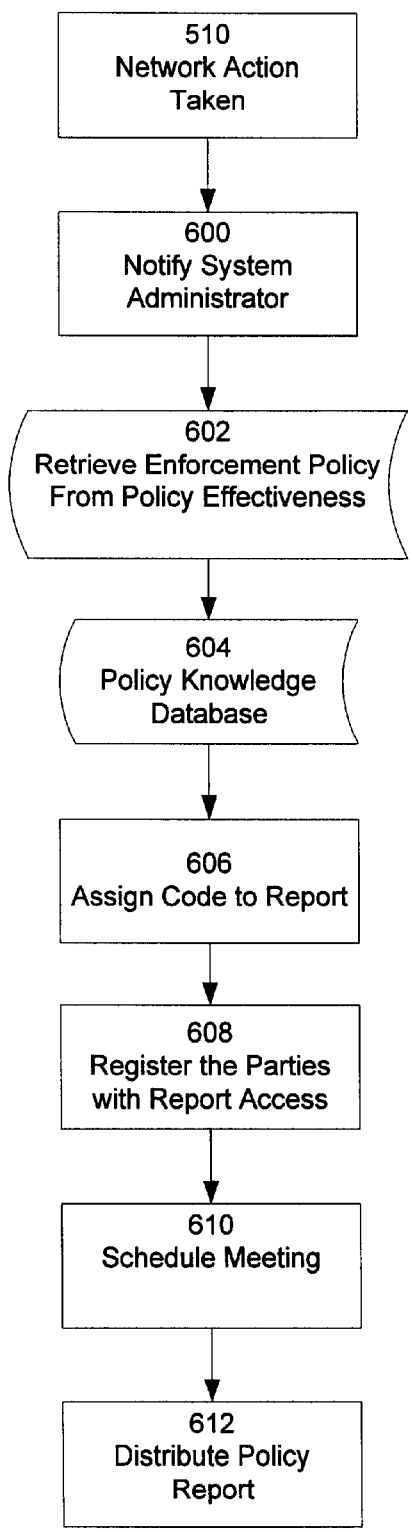
FIG. 6 is a block diagram illustrating the steps performed by a policy compliance and reporting module according to an embodiment of this invention.

FIG. 6 is a block diagram illustrating the steps performed by a policy compliance and reporting module according to an embodiment of this invention.

The policy compliance and reporting process begins when the policy compliance and reporting 115 receives a signal from the compliance monitor 110 that a network compliance action has been taken. Block 510 represents that a network compliance action has been taken by the policy effectiveness system 100.

Block 600 represents the policy compliance and reporting 115 sending an email or pager message to the system administrator notifying the administrator that a network user compliance violation has occurred. The email message attaches a policy compliance violation report (file) to the email and instructs the system administrator to follow the compliance reporting procedures. FIG. 38 is an exemplary screen display illustrating a policy compliance violation report according to an embodiment of the invention. The email instructs the system administrator to log into the system, present a password and hardware token to access the policy violation reporting procedures and indicates the screen option to choose. The screen options available to the system administrator may include: file a policy compliance violation report, investigate a policy compliance violation report, review audit and system reports, the appeal process, review a user profile, policy resources, and policy effectiveness reports.

File a Policy Violation Report

Figure 39:
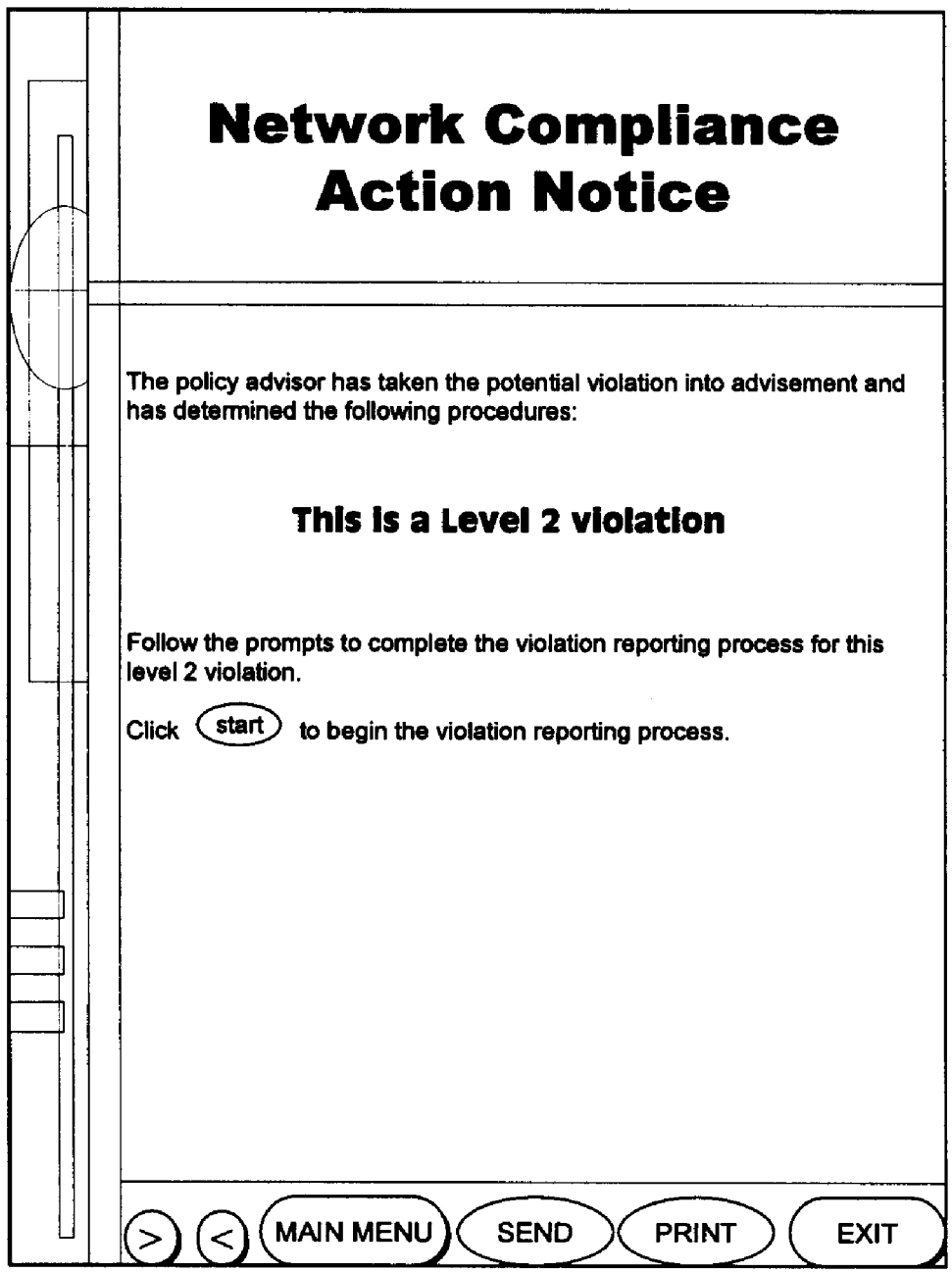
FIG. 39 is an exemplary screen display illustrating a network policy action notice according to an embodiment of the invention.

In a preferred embodiment, a screen is displayed to the system administrator indicating a network user policy compliance violation has occurred and a network user compliance action, level two or greater, has been taken. The system administrator is instructed to click on an icon to access the network user policy compliance violation information and document the violation. FIG. 39 is an exemplary screen display illustrating a network policy action notice according to an embodiment of the invention.

Block 503 represents the policy compliance and reporting 115 retrieving the network user policy compliance violation documentation from the policy effectiveness module 120. Policy compliance and reporting 115 advises the system administrator on how to execute the designated network user compliance violation reporting procedures. This is achieved by prompting the system administrator through the reporting process and presenting a policy knowledge base. FIG. 40 is an exemplary screen display illustrating a policy knowledge query according to an embodiment of the invention. A support icon is also available if the user needs to discuss a specific procedure with a Policy Consultant.

Block 604 represents the policy knowledge database of the policy compliance and reporting 115. The policy knowledge database is comprised of automated network user policy compliance violation documentation. This may include network policy violation report forms, detailed reporting instructions, and investigation procedures checklist. The policy compliance and reporting 115 analyzes the network user policy compliance violation information from the policy knowledge database 604 and determines if an investigation action is needed.

After the system analyzed the violation information, a policy violation investigation report form is displayed on the user screen. FIG. 41 is an exemplary screen display illustrating a policy compliance violation report according to an embodiment of the invention. All reports are documented in read-only format and all modifications and changes to the non-compliance reports are an addendum to the initial report. The system administrator is asked- to supply the following network compliance violation information regarding the claim including the network user's name: E-mail address, title, department, mail station, type of violation (non-compliance drop down box), date of occurrence, date of report, and official report of the incident (MIS, the user, or policy officer).

Figure 42:
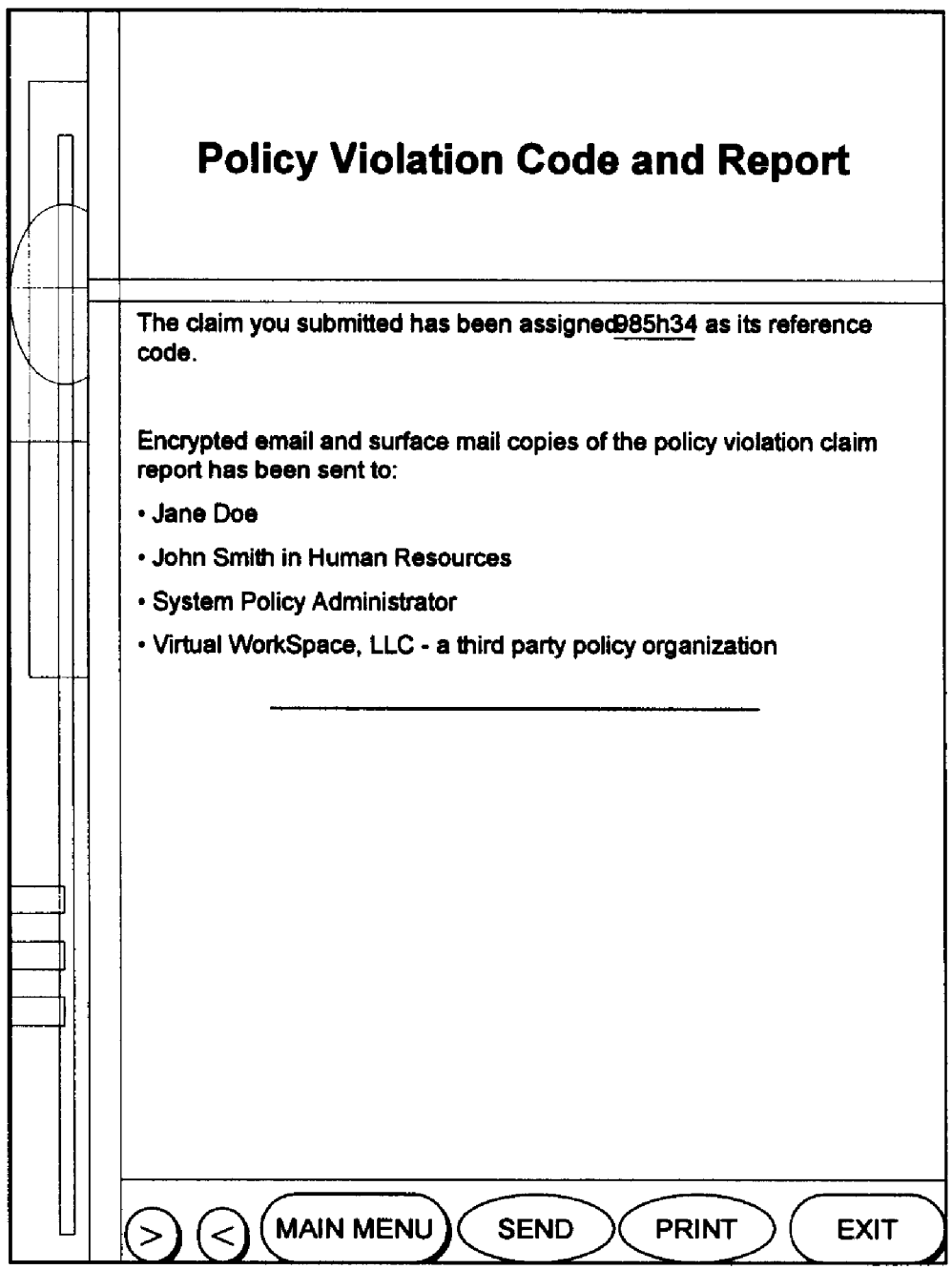
FIG. 42 is an exemplary screen display illustrating a policy compliance violation code and report according to an embodiment of the invention.

A code is assigned to the policy compliance violation report. FIG. 42 is an exemplary screen display illustrating a policy compliance violation code and report according to an embodiment of the invention. Block 606 represents the policy compliance and reporting 115 assigning a code to the policy compliance violation report. The code is used to identify and track the policy compliance violation report in the policy effectiveness database. The system administrator, the policy officer and the network user are the parties that may access the policy compliance violation report. To access the policy compliance violation report the system administrator, the policy officer and the network user are given the access code to the report and are registered in the system. While completing the report, the system administrator can access a network user's policy compliance report to review their network activity history. All report communications, including the policy compliance violation report, may automatically be sent via encrypted e-mail to a third party organization and are kept in escrow. This insures the organization cannot access the policy compliance reports in the system to change the content of the reports and insure that they follow due process procedures.

The system administrator may contact the policy officer to schedule an in-person appointment with the network user.

Block 608 represents the policy compliance and reporting 115 recording the appointment. Block 610 represents the policy compliance and reporting 115 scheduling the appointment. A hyperlink to a scheduling module is activated. An example of a schedule module is Microsoft's Schedule Plus. Several meeting options are listed on the violation report to be e-mailed and surface mailed to the network user. FIG. 43 is an exemplary screen display illustrating a System Violation Notice Email and Snail Mail Notice according to an embodiment of the invention. The system monitors and records the reporting and investigation process in the policy effectiveness database.

All registered parties are automatically e-mailed the policy compliance violation report, all correspondence related to the report and the appointment date. Block 508 the report information is distributed. Copies of policy compliance violation report is automatically sent to policy effectiveness, e-mailed to policy officer, surface mailed to the network user, e-mailed to the network, and surface mail copy printed and sent to the network user. The surface mail and e-mail reports are form letters that may include an Internet address to help inform the network user about the policy compliance violation reporting process. Policy compliance and reporting 115 tracks and monitors the status of the complaint by monitoring the scheduling module and tracking where the report is in the system. Block 612 represents the policy compliance and reporting 115 distributing the policy compliance violation report information.

Printed copies of the policy compliance violation report, correspondence, and related documents have a watermark printed in the header of the print out of the policy compliance violation report with the words "corporate record" printed on the top corner of the document. The printout may include the date the document was created, who created the document, the version number of the report and the file path. This is used to insure the authenticity of the policy compliance violation report.

Subsequent Action Report

Figure 7:
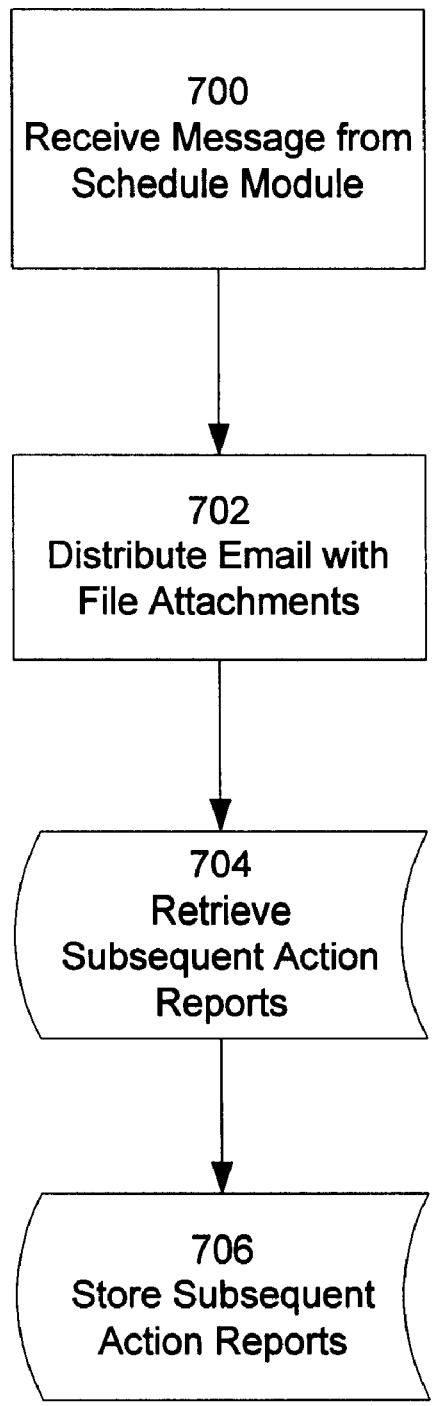
FIG. 7 is a block diagram further illustrating the steps performed by a policy compliance and reporting module according to an embodiment of this invention.

FIG. 7 is a block diagram further illustrating the steps performed by the policy compliance and reporting module 115 according to an embodiment of this invention in generating a subsequent action report. FIG. 44 is an exemplary screen display illustrating a Subsequent Action Report according to an embodiment of the invention. Block 700 represents the policy compliance and reporting module 115 receiving a message from the schedule module to begin subsequent action procedures. The policy officer, the system administrator and the network user are automatically reminded via email of the requirement to individually file subsequent meeting reports with the system. Block 702 represents the policy compliance and reporting module 115 distributing notices via email. The policy officer, system administrator and the network user are required to present login and password/token information to file subsequent action reports with the system and to verify a policy compliance violation meeting occurred.

The network user is also asked to sign an agreement indicating he attended the policy enforcement meeting and reviewed the policies of the organization. The system administrator and policy officer are asked to confirm and document that the meeting took place. All parties are complete the forms. Block 704 represents the policy compliance and reporting module 115 retrieving subsequent action reports from the parties. The system stores the documents in the policy effectiveness database.

The system administrator is prompted by the system to confirm in the subsequent action report form. The subsequent action form indicates if the network user policy compliance violation claim is still under investigation, pending or is closed.

Block 706 represents the policy compliance and reporting module 115 storing information related to the subsequent action reports. The policy compliance and reporting module 115 monitors the status of all network user compliance violations to insure that violation reports are properly reported and managed.

The Appeal Process

Figure 8:
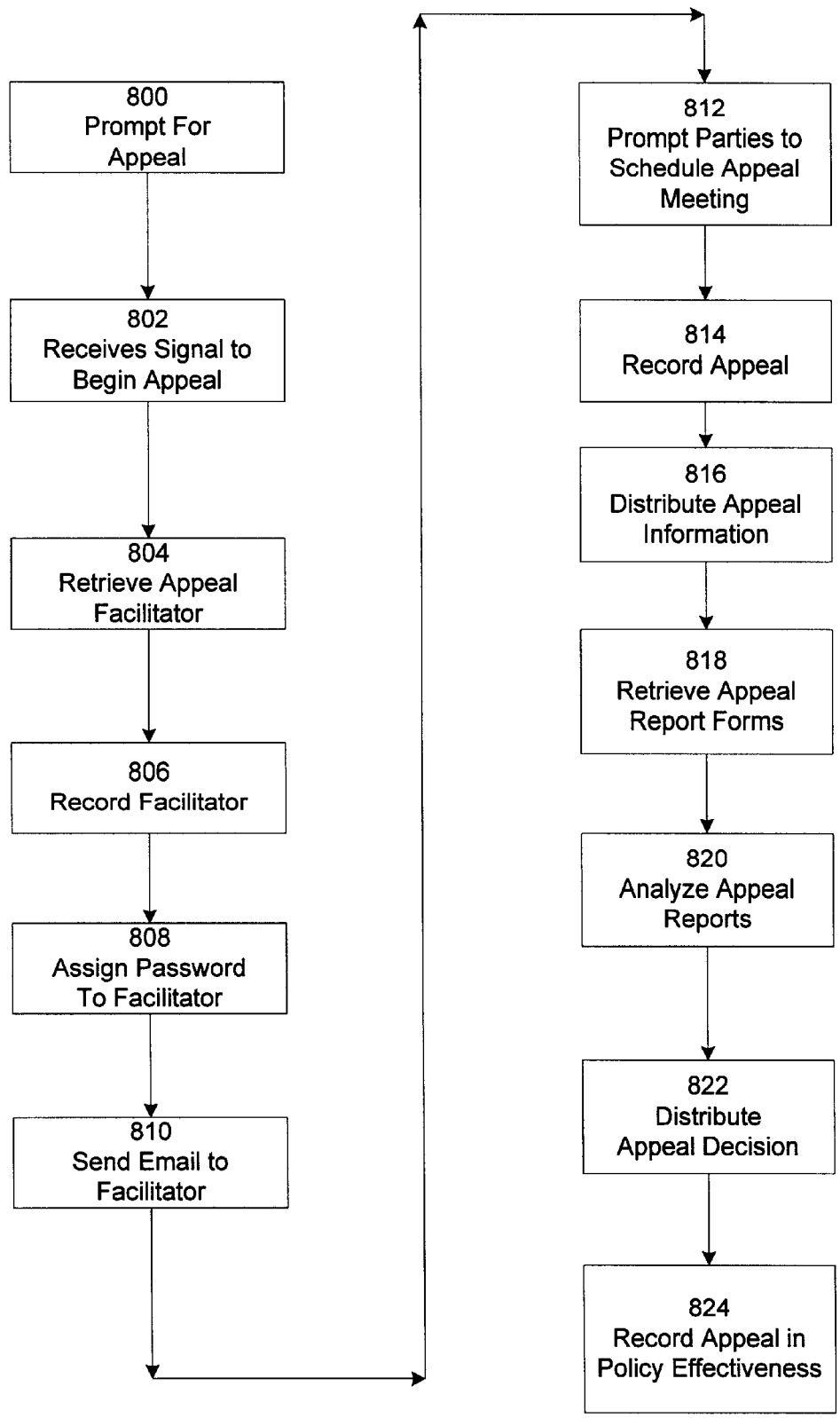
FIG. 8 is a block diagram illustrating the appeal process performed by a policy compliance and reporting module according to an embodiment of this invention.
Figure 45:
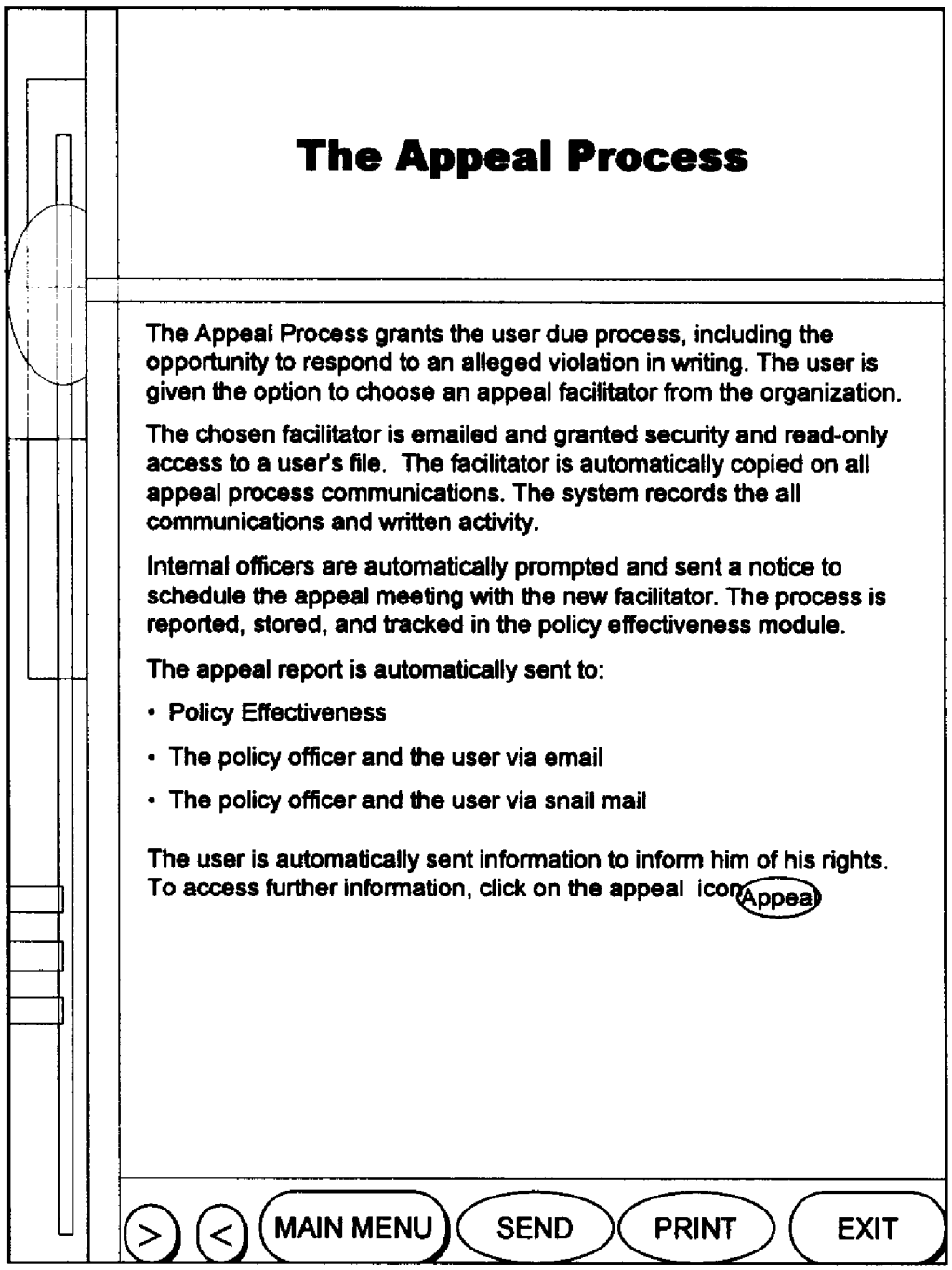
FIG. 45 is an exemplary screen display illustrating The Appeal Process according to an embodiment of the invention.

FIG. 8 is a block diagram illustrating the appeal process performed by a policy compliance and reporting module according to an embodiment of this invention. FIG. 45 is an exemplary screen display illustrating The Appeal Process according to an embodiment of the invention. After filing the subsequent action report, the system gives the network user the opportunity to respond to appeal the network compliance violation. Block 800 represents the policy compliance and reporting module 115 prompting network user with the appeal option. Block 802 represents the policy compliance and reporting module 115 receiving a signal to begin appeal process. The network user is given the option of choosing an appeal facilitator from the organization. Appeal facilitators are employees of the organization randomly chosen by the system to act a facilitator for the appeal process. The policy compliance and reporting module 115 reviews network user profiles and chooses the network users with the lowest network user policy compliance violation records to be facilitator candidates. Block 804 represents the policy compliance and reporting module 115 retrieving appeal facilitator information from the policy compliance and reporting database. The user chooses the facilitator from the Appeal screen. The system records the process and automatically sends an email to the facilitator. Block 806 represents the policy compliance and reporting module 115 recording the facilitator. Block 808 represents the policy compliance and reporting module 115 assigning a password to the facilitator. Block 810 represents the policy compliance and reporting module 115 sending an email to the facilitator. The e-mail explains the appeals process to the facilitator and provides the facilitator with the passwords needed to access to the network user policy compliance violator's file. The facilitator has read-only access to the network user compliance violation reports. The facilitator is automatically copied on all appeal process communications. The system records this activity and stores it in the policy effectiveness database.

Next, the internal officers are automatically prompted and sent a notice to schedule the appeal meeting with the new facilitator, the network user, the system administrator and the policy officer. Block 812 represents the policy compliance and reporting module 115 prompting users to schedule an appeal meeting. The process is reported to, stored, and tracked in the policy effectiveness module. Block 814 represents the policy compliance and reporting module 115 the system recording the process. The appeal report is automatically sent to internal policy officers. The network user is automatically sent information to inform him of his procedural rights. The appeal report is automatically sent to the policy effectiveness module, the policy officer and the network user, and a surface mail is sent to the policy officer and the violator. Block 816 represents the policy compliance and reporting module 115 distributing appeal information to all parties.

The facilitator logs into the system and reviews all of the documents regarding the policy violation. The facilitator, the policy officer and the suspected violator meet to listen to the violator's appeal. The facilitator and the policy officer are required to present login and password/token information to file appeal reports and to verify an appeal meeting occurred. Block 818 represents the policy compliance and reporting module 115 retrieving appeal report forms from policy compliance and reporting database. The appeal reports are comprised of several fields. The facilitator and the policy officer are required to complete the online reports. The policy effectiveness analyzes the appeal reports to determine the final decision. Block 820 represents the policy compliance and reporting module 115 analyzing the appeal reports. An email is sent to all parties with the final decision file attached. Block 822 represents the policy compliance and reporting module 115 distributing the final appeal decision. Block 824 represents the policy compliance and reporting module 115 transferring the appeal information to the policy effectiveness module 120.

Policy Effectiveness 120

The policy effectiveness module 120 electronically collects, records, analyzes and stores information from policy compliance monitoring, analyzes policy compliance and reporting, evaluates network policy compliance actions undertaken in response to the network security policy violations and electronically implements a different network security policy selected from network security policies stored in a policy database.

Figure 46:
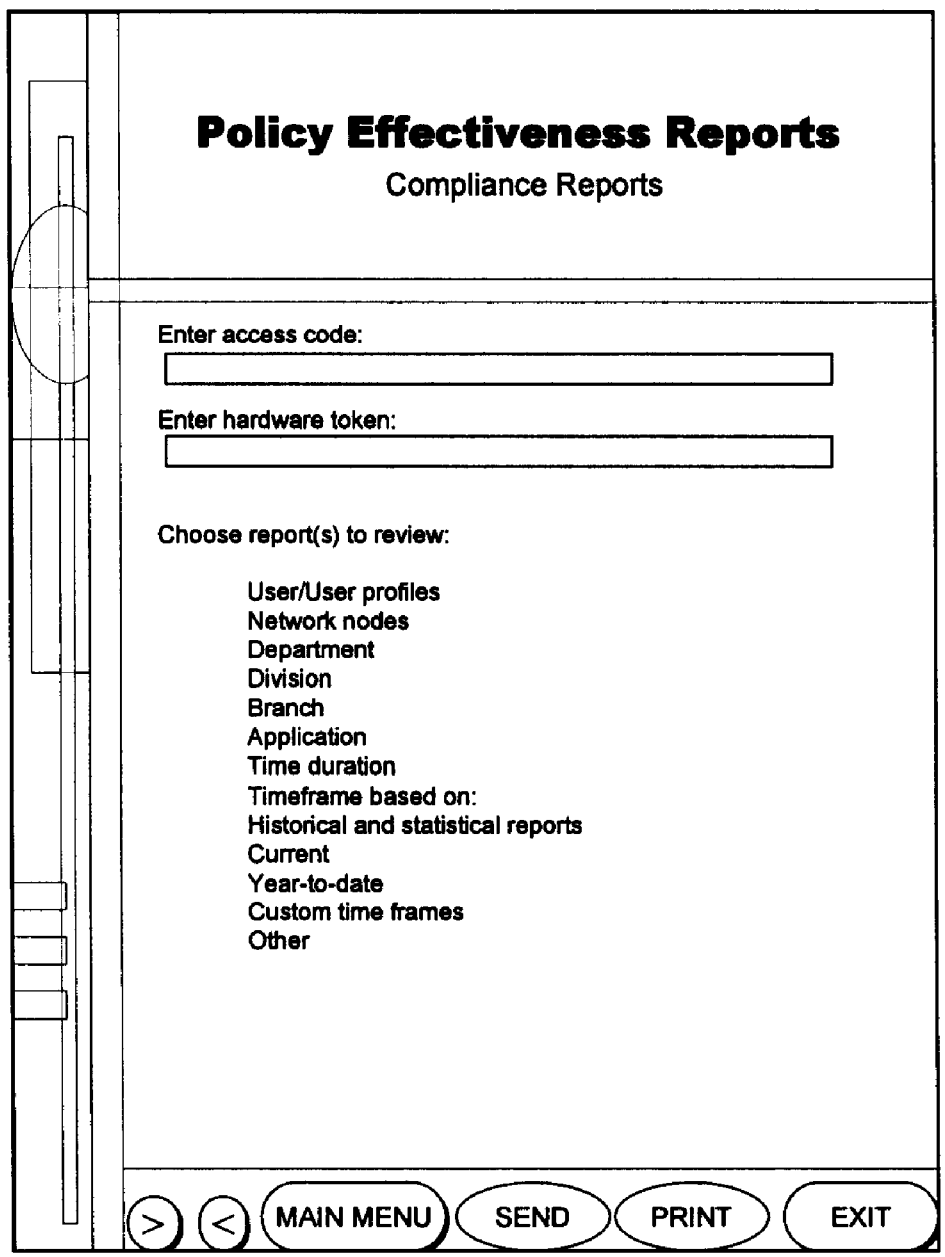
FIG. 46 is an exemplary screen display illustrating policy effectiveness reports according to an embodiment of the invention.
Figure 47:
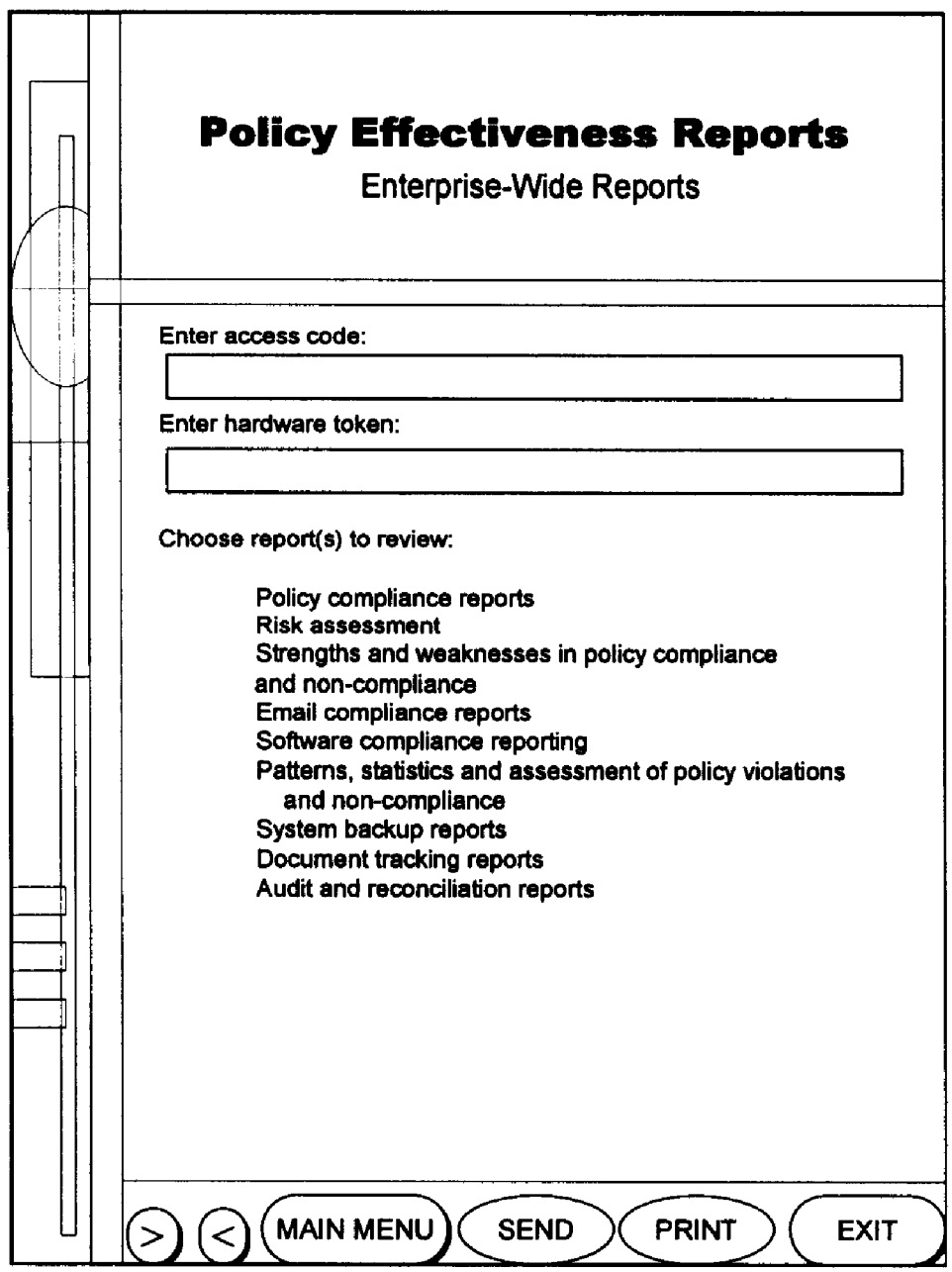
FIG. 47 is an exemplary screen display illustrating policy effectiveness reports according to an embodiment of the invention.

The policy effectiveness module 120 analyzes information collected from the policy compliance and reporting 115 to determine if network user compliance policies are effective. FIG. 46 is an exemplary screen display illustrating policy effectiveness reports according to an embodiment of the invention FIG. 47 is an exemplary screen display illustrating policy effectiveness reports according to an embodiment of the invention. If a policy is determined to be ineffective, a new policy may need to be implemented.

The policy effectiveness module 120 monitors the policy compliance actions taken over a period of time. At the time the system is implemented, the system administrator may set the system to measure network compliance actions that have been undertaken on a monthly, quarterly, annual, historic (e.g., year-to-date) basis. After the monitoring time period has been recorded in the system, the system administrator may record the number of network policy compliance actions, per network compliance policy, considered acceptable during a said period of time.

The policy effectiveness module 120 analyzes the policy compliance actions stored in the policy compliance and reporting module 115. Each policy is assigned a value representing a target baseline compliance level for network policy compliance ("network policy compliance"). In the preferred embodiment, the numeric value assigned to each monitored policy is 95, representing that for each policy 95% user compliance is required. The level of user compliance for a group of network users with respect to a particular policy is monitored. The network user compliance activity for a group has a numeric value the system monitors representing the degree of group user policy compliance ("group user policy compliance"). The network compliance value is monitored in relation to the user compliance value stored in the network security policy database 506.

Figure 9:
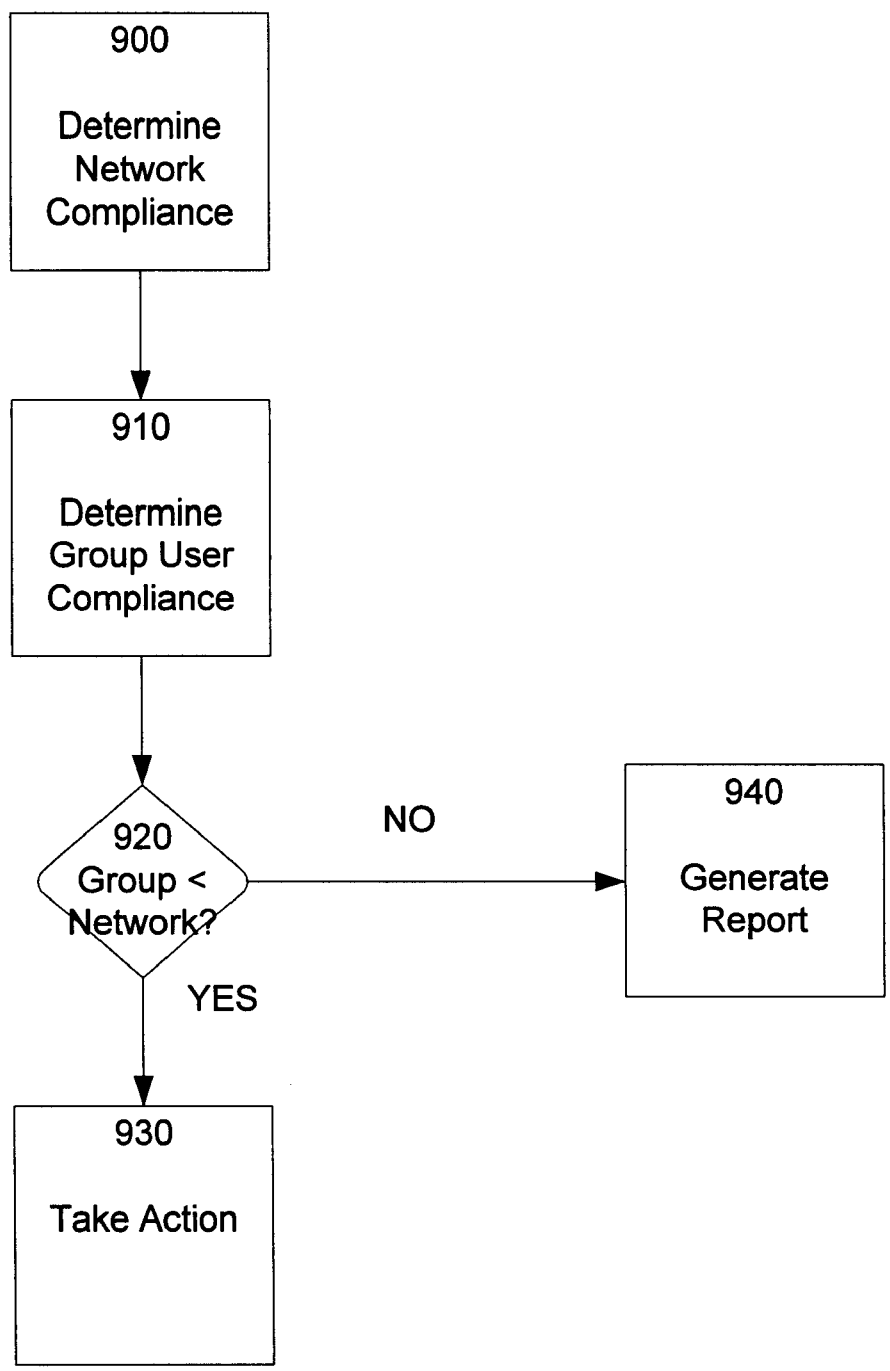
FIG. 9 is a block diagram further illustrating a policy effectiveness system according to an embodiment of this invention.

FIG. 9 is a block diagram further illustrating a policy effectiveness system according to an embodiment of this invention.

Block 900 represents the policy effectiveness module 120 determining network policy compliance. Block 910 represents the policy effectiveness module 120 determining group user compliance. Block 920 is a decision block representing the policy effectiveness module 120 analyzing the network policy compliance value in relation to the group user compliance policy value. If the group user policy compliance value is greater than or equal to the network policy compliance value, then block 940 represents the policy effectiveness module 120 recording that the network is in compliance with respect to a policy. Otherwise, if the network policy compliance value is greater than the group user policy compliance value, the policy effectiveness module 120 measures the difference between the network policy compliance value and the group user policy compliance value and may undertake a network compliance action in response to that difference.

Each compliance action in the group is assigned a value related to a numeric value that may be reported from monitoring network user compliance. The numeric value assigned is based on the severity of the network policy compliance violation, i.e. the difference between the network policy compliance value and the group user policy compliance value. Upon recording the difference between the network policy compliance value and the group user policy compliance value, the policy effectiveness module 120 records this information in the network security policy database 130 and begins undertaking the appropriate network compliance action. This action may include electronically implementing a different network security policy selected from network security policies stored in the database, generating policy effectiveness reports, and providing a retraining module to network users.

Figure 48:
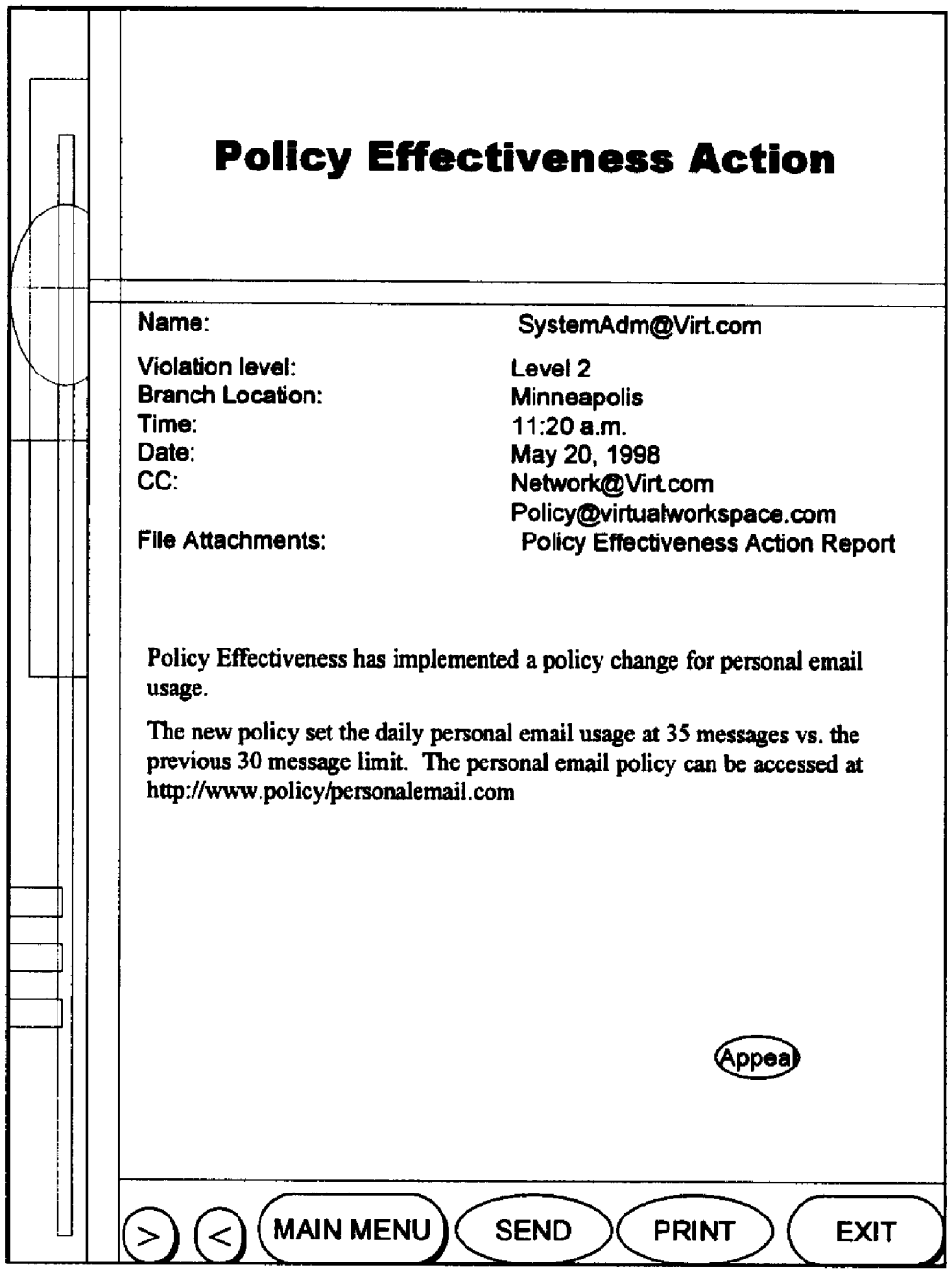
FIG. 48 is an exemplary screen display illustrating a policy effectiveness according to an embodiment of the invention.

For example, the system administrator may have indicated that the password policy can not have more than 5 network compliance action occur per month. If the network compliance action is greater than 5 actions per month, the system sends a message to retrieve a different policy from the database 130. The policy selected based on indexing criteria and on the difference between the group user policy compliance and the network policy compliance values. Each policy has several actions ranging from lenient to restrictive. The policy effectiveness module 120 reviews the information collected by policy effectiveness to determine which policy to modify and the action to take. The policy effectiveness module 120 records the policy change and sends an email message to the system administrator to confirm the policy changing process. FIG. 48 is an exemplary screen display illustrating a policy effectiveness action according to an embodiment of the invention. An enterprise wide email is also sent to all network users to alert them to the change in policy.

Policy Resources 145

Figure 49:
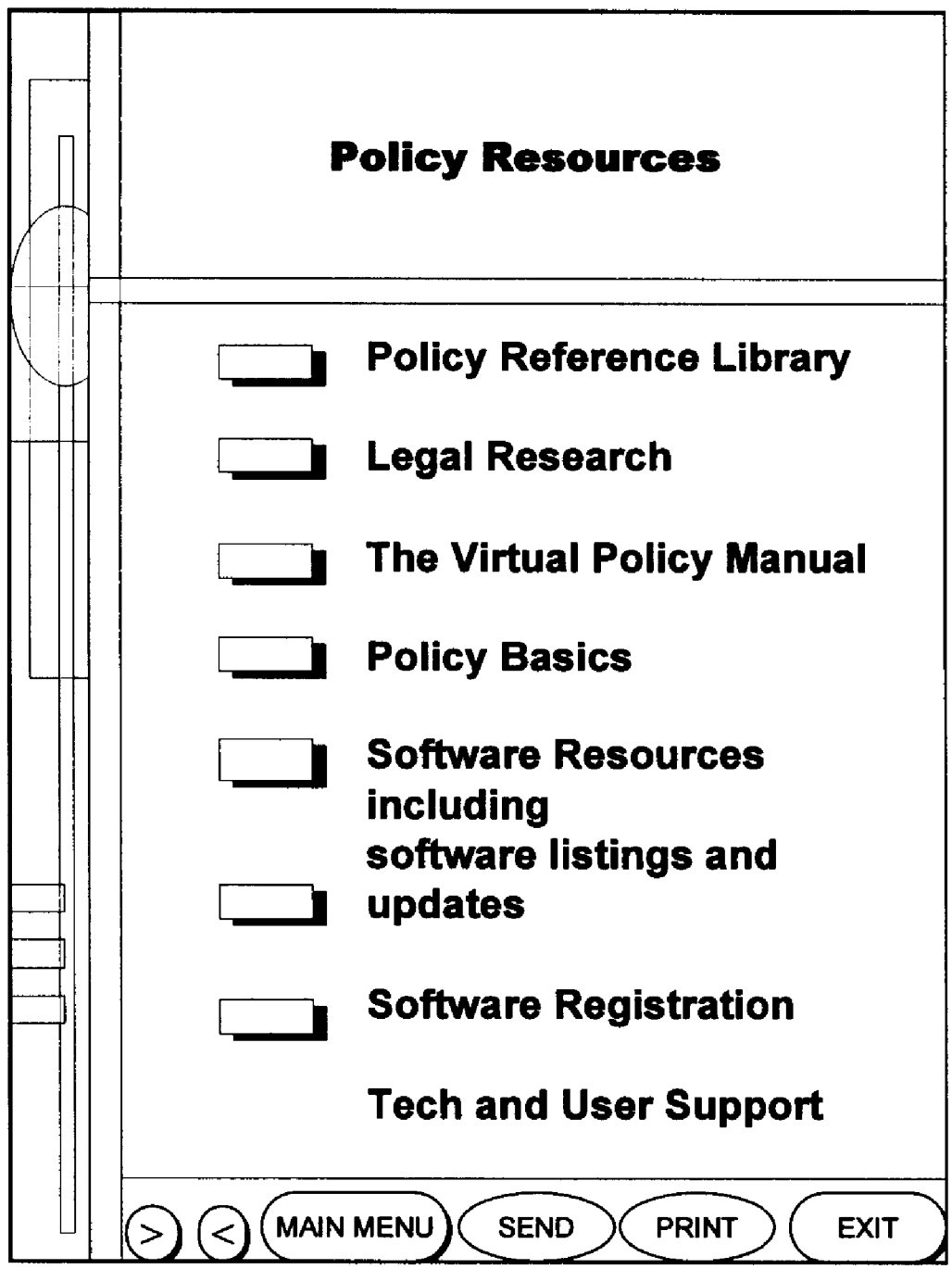
FIG. 49 is an exemplary screen display illustrating policy resources according to an embodiment of the invention.

The policy effectiveness system 100 includes a policy resources 145 database and software resources database to help users and administrators maintain policy compliance. FIG. 49 is an exemplary screen display illustrating policy resources according to an embodiment of the invention. Materials included in the policy resources database 145 include a policy reference library, legal research, a policy manual, a and a self-serve policy section. The policy reference library has a search engine to help the user quickly search and find policy information. Users can contact support personnel either by email, page, telephony, fax, or telephone. It is important that users have immediate access to a support person, since major policy violations may require organizations to act quickly in order to protect their network from damage. Internal legal and policy personnel can access legal statutes and other related policy documentation relating to email and virtual policies in the workplace. The policy manual is presented to users such that they will be able to read and review the policy manual periodically. Users are periodically required to sign an online form indicating he or she has read the policies, and any policy revisions, and understands all of policies. Annual updated information will be highlighted for fast review. The policy effectiveness system 100 tracks users visit to the policy. The self-serve policy section allows the policy officer to revise the policy. The policy officer is prompted to access a policy database and is instructed to download a new policy when the system has determined that a policy is ineffective and users are consistently out of compliance with the current policy. The new policy(s) are automatically added to the policy effectiveness system and the organization's policy manual.

Software resources include software listings and updates, guidelines for proper use including email etiquette, and netiquette training, Internet information and personal safety training, optional registration of an encryption private or public key with the system, a listing of the organization's approved and licensed software, software downloading guidelines and approved procedures, tech support for user's questions Registering newly downloaded software to the system, management approved trialware, shareware and others for review by the organization, operations and support information, regulation, policy, and Freedom of Information Act materials, information explaining how the system works including product support and services, telephony, text-based support, and in-house support options, a simple do & don't security module for non technical activity, and online safety information Security, System Backup, and Recovery Processes Users must present a password and hardware token to access the policy effectiveness system 100. Most organizations concentrate their security resources on securing the perimeter of their network. Unfortunately, the greatest threat to an organization is its employees, who, with network access can cause greater damage than an external intruder.

The policy effectiveness system 100 employs an electronic tag to monitor document level access, security and to track information on a per document basis. This creates the opportunity to prove document authenticity, to track the copies and revisions of a document, and to monitor and report document access and disclosures.

System Backup and Recovery

The policy effectiveness system 100 has an online backup feature. This feature offers full redundancy, without the expense of off-site storage, and limits the process of physically cataloging and indexing backup tapes. Cataloging and indexing backups is automatically completed by the system. Backman is an existing software that does this.

Software Compliance

Most large organizations are not cognizant of the type of software licenses they have, which workstation and/or server has which software, who is using what software, and whether or not the organization is in compliance with their software licensing agreements. Users can easily download freeware, shareware trialware, and permware software from the Internet. All software is distributed with compliance conditions or restrictions of its use, even if it is identified as freeware, shareware and trialware, or is copyrighted but freely distributed.

To effectively monitor an organization's software compliance, periodic network audits are needed to identify deviations in the software inventory, and to reconcile software license agreements with software and hardware inventories. Products that monitor software licenses are known in the art, for example the FlexIM software by Globetrotter.

Each user is registered in the user profile database 150. The user profile database 150 includes a user's hardware and software inventory information, as well as the user's name, user's email address, user's surface mail address, employment status (e.g., temp, contract, virtual), title, department, organizational chart indicating who the user reports to, the direct reports, his assistant, and mail station address. It also may indicate the software present on a user's workstation and the user's system access and security status.

The user profile database 150 also retain copies of any Employment Agreements and other employment-related contracts, maintains a record of the users' policy training and exam status, policy compliance history, network activity, and any special network access or privileges such as using the network for charitable use. Additionally, the user profiles 150 may also monitor software downloads from the network, or Internet, to hardware through network activity reports and network audits, including any software approved for use by management and other special approvals. Additional user information can be monitored and collected to assist the organization's reporting needs.

The policy effectiveness system 100 includes an object library/object level licensing system similar to FlexIM by Globetrotter.

The policy compliance monitor 110 features dynamic updating and exchanging of software licensing agreements. The compliance monitor 110 reviews all software license agreements and maintains records of the vendor information. The compliance monitor 110 sends a notification to the system administrator indicating that a software license is about to expire. The system administrator is prompted to send an email to the licensing organization to update the license agreement. Once the updated license agreement is received via email, the system automatically updates the software license registered and stored in the compliance monitor 110.

The policy effectiveness module 120 monitors and tracks network activity including all hardware and software in the policy effectiveness system 100. This module can generate reports to track an organization's user access including failed login attempts and all attempts to launch privileged applications, any changes to system configuration parameters software downloads from the Internet, software and hardware usage, location of software, location of software license agreements, type of software agreements, coordination of software license agreements with software utilization, statistical and graphical information regarding justification for software purchases, upgrades and maintenance expense, software installations, software compliance, appropriateness, inappropriateness and excessive use of software and hardware resources throughout the enterprise, the number of people waiting for access to software applications, access time, value of software being used at anytime, the need for upgrades, the need for training, projections for hardware, software and licensing costs/usage throughout the enterprise, hardware demand predictions, recommended re-route of software and hardware, personally installed or permitted software installation, need to streamline and more effectively use under utilized system resources, over utilization of system resources, potential policy infringements, system trends per department use, and the allocation of related costs related to department.

Software Applications Archive

The system records the storage location of all the software applications, software manuals, and software vendor information used by the organization to create documents. In the event that records or documents, written in older versions of software, must be produced, the software will be preserved and available for use.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for dynamically assisting a system administrator of a computer network in upgrading compliance policy based on behavior of system users, the method comprising the steps of:
   storing in a database a plurality of compliance policy options;
   developing an initial compliance policy option potentially applicable to network users;
   automatically evaluating over time the appropriateness of the initial compliance policy option based on the potentially evolving compliance history of users;
   automatically compiling and providing to the system administrator over time a dynamic knowledge base comprising automated network user policy compliance violation documentation;
   automatically determining from the knowledge base policy compliance violation documentation that the initial compliance policy option is ineffective;
   automatically selecting from the database and recommending to the system administrator an alternate compliance policy option; and
   automatically requesting that the system administrator confirm the chance to the alternate compliance policy option,
   whereby compliance policy options are dynamically altered and provided to the system administrator in order to eliminate ineffective compliance policy options.

2. The method of claim 1, further comprising the steps of:
   electronically generating a network security policy compliance value based on monitoring network user compliance for a plurality of network users;
   electronically comparing the compliance value to a target compliance value, wherein the target compliance value defines a baseline for network security compliance; and
   undertaking a network policy compliance action based on a difference between the compliance value and the target compliance value.

3. The method of claim 2, wherein the compliance option is selected from a group comprising:
   electronically implementing a different network security policy selected from network security policies stored in the database;
   generating at least one policy effectiveness reports; and
   providing a retaining module to network users.

4. The method of claim 1, further comprising the step of electronically undertaking a user compliance action in response to evaluating network users' compliance with a network security policy.

5. The method of claim 4, wherein the evaluating step comprises the steps of:
   generating a network security policy compliance value based on monitoring network user compliance; and
   comparing the compliance value to a target compliance value, wherein the target compliance value defines a baseline for network security policy compliance; and
   wherein the undertaking step is based on a difference between the compliance value and the target compliance value.

6. The method of claim 5, wherein the user compliance option is selected from a group comprising:
   notifying a network user;
   notifying a policy administrator;
   providing a retraining module to the network user; and
   restricting the network user's network access rights.

7. The method of claim 3, wherein at least one network security policy has a security level identifier identifying the relative restrictiveness of the policy, wherein the implementing step includes the step of electronically selecting a network security policy based on the security level identifier.

8. The method of claim 1, further comprising the step of interactively generating a network security policy, the generating step comprising the steps of:
   electronically providing a suggested network security policy to a plurality of network users;
   electronically receiving a modified network security policy from at least one of the network users;
   electronically providing at least one of the modified policies to the network users; and
   receiving a group modified policy from the network users.

9. The method of claim 1, further comprising the steps of:
   electronically monitoring network user compliance with the compliance policy, including the steps of:
      electronically providing a network policy exam to a network user;
      electronically receiving exam answers from the network user
      electronically evaluating the exam results to generate an evaluation score;
      notifying the network user of the evaluation score; and
      storing the evaluation score in a database.

10. The method of claim 1, wherein the compliance policy comprises:
    a network hardware policy;
    an email policy;
    an internet policy;
    a software license policy;
    a document management system policy; and
    a network security enforcement policy.

11. An apparatus for dynamically assisting a system administrator of a computer network in upgrading compliance policy based on behavior of system users, the apparatus comprising:
    a computer system comprising at least one processor and at least one memory, the computer system being adapted and arranged for:
       storing in a database a plurality of compliance policy options;
       developing an initial compliance policy option potentially applicable to network users;
       automatically evaluating over time the appropriateness of the initial compliance policy option based on the potentially evolving compliance history of users;
       automatically compiling and providing to the system administrator over time a dynamic knowledge base comprising automated network user policy compliance violation documentation;

automatically determining from the knowledge base policy compliance violation documentation that the initial compliance policy option is ineffective;

automatically selecting from the database and recommending to the system administrator an alternate compliance policy option; and automatically requesting that the system administrator confirm the change to the alternate compliance policy option, whereby compliance policy options are dynamically altered and provided to the system administrator in order to eliminate ineffective compliance policy options.

12. An article of manufacture for dynamically assisting a system administrator of a computer network in upgrading compliance policy based on behavior of system users, the article of manufacture comprising a computer-readable storage medium having a computer program embodied therein that causes the computer network to perform the steps of:

storing in a database a plurality of compliance policy options;

developing an initial compliance policy option potentially applicable to network users;

automatically evaluating over time the appropriateness of the initial compliance policy option based on the potentially evolving compliance history of users;

automatically compiling and providing to the system administrator over time a dynamic knowledge base comprising automated network user policy compliance violation documentation;

automatically determining from the knowledge base policy compliance violation documentation that the initial compliance policy option is ineffective;

automatically selecting from the database and recommending to the system administrator an alternate compliance policy option; and automatically requesting that the system administrator confirm the chance to the alternate compliance policy option, whereby compliance policy options are dynamically altered and provided to the system administrator in order to eliminate ineffective compliance policy options.

* * * * *